(12) United States Patent
Hutchinson et al.

(10) Patent No.: US 7,819,472 B2
(45) Date of Patent: Oct. 26, 2010

(54) LATCH MECHANISM FOR A CHILD CAR SEAT

(75) Inventors: James M. F. Hutchinson, Mohnton, PA (US); Robert E. Haut, West Chester, PA (US); Curtis M. Hartenstine, Birdsboro, PA (US); Gregory S. Sellers, Christiana, PA (US); John T. Sims, Narvon, PA (US)

(73) Assignee: Wonderland Nurserygoods Co., Ltd., Neihu, Taipei (TW)

( * ) Notice: Subject to any disclaimer, the term of this patent is extended or adjusted under 35 U.S.C. 154(b) by 139 days.

(21) Appl. No.: 12/204,964

(22) Filed: Sep. 5, 2008

(65) Prior Publication Data

US 2009/0001791 A1  Jan. 1, 2009

Related U.S. Application Data

(63) Continuation-in-part of application No. 11/953,062, filed on Dec. 9, 2007, now Pat. No. 7,735,921.

(60) Provisional application No. 60/993,473, filed on Sep. 12, 2007, provisional application No. 60/874,392, filed on Dec. 12, 2006.

(51) Int. Cl.
  *A47D 1/10* (2006.01)
  *A47C 7/62* (2006.01)
(52) U.S. Cl. ................ 297/256.16; 297/217.6
(58) Field of Classification Search ............ 297/250.1, 297/256.16, 217.6, 217.4
  See application file for complete search history.

(56) References Cited

U.S. PATENT DOCUMENTS

| | | | |
|---|---|---|---|
| 4,634,177 A | 1/1987 | Meeker | 297/250 |
| 4,754,999 A | 7/1988 | Kain | 297/250 |
| 5,581,234 A | 12/1996 | Emery | 340/457.1 |
| 5,890,762 A | 4/1999 | Yoshida | 297/256.13 |
| 6,485,080 B2 | 11/2002 | Hansen et al. | 296/65.03 |
| 6,682,143 B2 | 1/2004 | Amirault | 297/250.1 |
| 6,746,080 B2 | 6/2004 | Tsugimatsu | 297/256.13 |
| 7,338,122 B2 * | 3/2008 | Hei et al. | 297/256.12 |
| 2005/0264064 A1 | 12/2005 | Hei | 297/250.1 |

(Continued)

FOREIGN PATENT DOCUMENTS

EP  1593545  9/2002

(Continued)

*Primary Examiner*—Milton Nelson, Jr.
(74) *Attorney, Agent, or Firm*—Miller Law Group, PLLC

(57) ABSTRACT

A latching mechanism for a car seat that is mountable on a separable base member provides a positive locking of the car seat to the base member. The latch mechanism has a member that is positioned in the seat portion of the car seat to pivot upwardly when the latch mechanism is disengaged. The seating of a child on the seat portion requires the latch mechanism to be retracted into the seat portion, which corresponds to the locking of the latch mechanism. The latch mechanism includes four helical spools rotated by the pivotal movement of the latch lever to cause linear movement of the locking pins into engagement with the base member. A latch indicator has a pre-latch sensor that indicates proper positioning of the seat member and a latch sensor that indicates an engagement of the locking pins. An indicator light illuminates when the seat member is properly latched.

28 Claims, 23 Drawing Sheets

U.S. PATENT DOCUMENTS

| | | | |
|---|---|---|---|
| 2005/0275258 A1 | 12/2005 | Patterson | 297/256.16 |
| 2006/0111821 A1 | 5/2006 | Wallner | 297/250.1 |
| 2006/0273640 A1 | 12/2006 | Kassai | 297/256.16 |
| 2007/0296254 A1 | 12/2007 | Kahn | 297/265.16 |

FOREIGN PATENT DOCUMENTS

| | | |
|---|---|---|
| GB | 2346083 | 2/2000 |
| GB | 2381743 | 5/2003 |
| WO | WO 2007038832 | 4/2007 |

\* cited by examiner

LATCH MECHANISM FOR A CHILD CAR SEAT

CROSS-REFERENCE TO RELATED APPLICATIONS

This application claims domestic priority on U.S. Provisional Patent Application Ser. No. 60/993,473, filed on Sep. 12, 2007, the contents of which are incorporated herein by reference. This application is also a continuation-in-part of U.S. patent application Ser. No. 11/953,062, filed on Dec. 9, 2007, now U.S. Pat. No. 7,735,921, and which claims domestic priority on U.S. Provisional Patent Application Ser. No. 60/874,392, filed on Dec. 12, 2006.

FIELD OF THE INVENTION

The present invention relates generally to a car seat for use in transporting children in an automobile, and, more particularly, to a latch mechanism that connects the car seat to a base member in either a front-facing or a rear-facing orientation.

BACKGROUND OF THE INVENTION

Car safety seats for children are commercially available in a many configurations corresponding to differences in the age, weight, and size of the child being transported. Parents can choose a car seat that is not only the correct size, but also suits their tastes, budget, and life style. As children grow in size and maturity level, they need different kinds of car seats. For example, a child may initially use a rearwardly facing infant car seat, then graduate to a forward facing toddler seat with an integrated harness, and finally to a belt positioning booster seat utilizing the vehicle's lap and shoulder belt system before being able to safely use the vehicle's seat belts alone.

There are many car seats on the market that can be used in multiple configurations. For instance, a forward facing car seat with an integral harness appropriate for a 20-40 pound child might accommodate a child weighing 30-100 pounds as a belt positioning booster seat with the removal of the harness and utilizing the vehicle's lap and shoulder belts. This is convenient for the care giver because it means fewer seats to purchase. Some parents choose to buy a belt positioning booster seat for their older child. Such a booster seat may be configured with a high back, such as is disclosed in U.S. Pat. No. 6,682,143, granted to Davis Amirault on Jan. 27, 2004, or can have no back at all. Older children who do not want to be seen sitting in a "baby seat" prefer the option of a belt positioning booster seat.

Currently available car seats typically have a monolithic shell, i.e. the back and seat cannot be used separately. Some car seats are designed to have a no back base option, but are configured as a separate seat fastened under the monolithic seat and back, such as is disclosed in U.S. Pat. No. 4,754,999, issued on Jul. 5, 1998, to James Kain. The problem with this configuration is the redundancy of seats; one as part of the monolithic shell, and one as a seat only. In U.S. Pat. No. 6,746,080, issued to Miho Tsugimatsu, et al on Jun. 8, 2004, a reversible child seat member is cooperable with a complex base apparatus that has a central latching mechanism. A cable actuated latching mechanism for connecting a car seat to a base member is shown in U.S. Patent Publication No. 2006/0273640 of Kenzou Kassai, published on Dec. 7, 2006.

The basic purpose of a child's car seat is to protect the child in case the vehicle in which the car seat is mounted is involved in a crash event. Protecting the child involves limiting excursion and controlling the forces exerted on the child from the vehicle undergoing a crash event. Improper installation of a car seat is a major factor in a loss of protection for the child. If the car seat requires a complicated or complex belt path along which the vehicle seat belt is positioned to secure the car seat to the vehicle seat, the likelihood that the car seat will be properly installed is diminished. A belt path for the vehicle seat belt that is more visible and easier to access will increase the likelihood that the car seat will have a tight, proper installation.

During the first year of the life of a baby, the child should be positioned in a car seat in a manner to be facing rearwardly. When the child is over a year old, the child can be placed in the car seat in a manner that the child is facing forwardly. Presently known car seats require a remounting of the car seat and a repositioning of the vehicle seat belt to accomplish this conversion in orientation or the substitution of a different and larger car seat. Each time the car seat is reconfigured or moved from one vehicle to another, a new opportunity to improperly mount the car seat on the vehicle seat is presented, which can be aggravated by a non-intuitive, complicated belt path for mounting the car seat.

Many child car seats provide options for reclining the seat relative to the vehicle seat on which the car seat is mounted. Most known child car seats require a readjustment of the vehicle seat belt when changes are made to the recline orientation of the car seat. Readjusting the vehicle seat belt is an inconvenience to the person making the recline adjustment and provides an additional opportunity for the car seat to become improperly installed, which would not provide the optimum safety for the child positioned within the car seat.

Providing a separable base member and car seat that incorporates a latching mechanism that detachably connects the car seat to the base member, establishes an opportunity to provide an indicator to show when the seat member is properly latched into the base member. A positive feedback to indicate that the latching mechanism has been properly engaged would be desirable. In U.S. Patent Publication No. 2005/0275258 of James Patterson, et al, published on Dec. 15, 2005, a first sensor is incorporated into the car seat to indicate the angular position of the car seat relative to a first axis. If the angular position is outside of a predetermined range, the controller provides an indicator of the improperly aligned car seat. U.S. Patent Publication No. 2006/0111821 of Edward Wallner, et al, published on May 25, 2006, discloses an event data recorder that utilizes sensors to indicate the position of the car seat so that the data recorder can be utilized to evaluate conditions of the car seat, such as during a car crash. Sensors are provided on the seat base and on the seat member to detect the proper latching of the seat to the base and to detect the proper coupling of the child's seat belt on the seat member in U.S. Patent Publication No. 2007/0296254 of Michael Kahn, published on Dec. 27, 2007, and a notification system is actuated if one of the sensed latch devices is not properly secured.

It would also be desirable to provide a latching mechanism that would positively secure the child car seat to the base member irrespective of the forward or rearward orientation of the car seat. It would also be desirable to provide a latching mechanism that will not be capable of operation if a child is seated in the car seat. It would also be desirable to provide a monitoring system that is operable to detect an ineffective latching of the car seat to the base member and provide a warning of the unsafe condition resulting from the improper latching of the car seat to the base member.

SUMMARY OF THE INVENTION

It is an object of this invention to provide a car seat for transporting children in an automobile that can be reversed from a rear-facing orientation to a forward-facing orientation without dismounting the car seat from the vehicle seat.

It is another object of this invention to provide a latching mechanism to secure the car seat to the base member irrespective of the orientation of the seat member on the base member.

It is a feature of this invention that the latching mechanism utilizes a single latch lever to actuate multiple locking pins that interengage the car seat and the base member.

It is an advantage of this invention that four locking pins carried by the car seat are retracted from and engaged into the base member through operation of a single latch lever.

It is another feature of this invention that at least a portion of the latching mechanism is disposed within the child seat portion so that the retraction of the locking pins from engagement with the base member results in a portion of the latching mechanism being projected upwardly out of the seat portion to prevent the child from disengaging the latching mechanism.

It is another advantage of this invention that the child residing on the seat member will prevent the latching mechanism from being actuated.

It is yet another advantage of this invention that the child sitting on the car seat prevents a portion of the latching mechanism from pivoting upwardly out of the seat member.

It is another feature of this invention that the latch lever causes a rotation of helical spools that are operatively coupled with the locking pins to affect linear movement of the locking pins.

It is still another feature of this invention that four helical spools are coupled to the latch lever to be actuated when the latch lever is moved.

It is yet another feature of this invention that the rear helical spools on each side of the car seat are operatively coupled to the corresponding front spool by a link to affect rotation of the rear spool in response to the rotation of the front spool.

It is still another advantage of this invention that the four spools are actuated simultaneously with the movement of the latch lever.

It is still another object of this invention to provide a positive indication of the proper latching of the car seat into the separable base member.

It is a further feature of this invention that proximity sensors are mounted on the car seat to sense the proximate presence of a magnetic strip placed appropriately on the base member such that a signal is generated only when the car seat is properly positioned on the base member.

It is an advantage of this invention that the sensors operative to indicate proper positioning of the car seat on the base member irrespective of whether the car seat is in a rear-facing or front-facing orientation.

It is still a further feature of this invention that the car seat is provided with a pre-latch sensor that indicates the proper positioning of the car seat relative to the base member and a latch sensor that indicates the closed position of the latch lever.

It is a yet further feature of this invention that the pre-latch and latch sensors are operatively coupled to a processor that will illuminate an indicator light when both sensors generate a signal.

It is a further advantage of this invention that the closing of the latch lever to activate the latch sensor will not cause illumination of the indicator light if the car seat is not properly positioned on the base member.

It is still a further advantage of this invention that the positive output from the latch indicator mechanism provides feedback that the car seat is properly mounted on the base member.

It is yet a further advantage of this invention that the latch indicator can be constructed as a mechanical device that provides an indication of a proper seating and latching of the seat member onto the base member.

It is still another feature of this invention that the latch indicator can be a pivoted device engagable with the transversely movable locking pins to expose a portion of the device that provides a positive indicator that the seat member is properly latched onto the base member.

It is still another advantage of this invention that the pivoted device is exposed through an opening in a side portion of the base member to expose one surface when disengaged by the locking pin and a different surface when pivoted by engagement with the locking pin.

It is yet another feature of this invention that the pivoted device is housed in a recline slot of base member so that engagement thereof by a locking pin can only be attained if the seat member is properly positioned on the base member in a prelatch orientation.

It is yet another object of this invention to provide a latching mechanism for a reversible car seat having a separable base member, which is durable in construction, inexpensive of manufacture, carefree of maintenance, facile in assemblage, and simple and effective in use.

These and other objects, features and advantages are accomplished according to the instant invention by providing a latching mechanism for a car seat that is mountable on a separable base member that provides a positive locking of the car seat to the base member. The latch mechanism has a member that is positioned in the seat portion of the car seat to pivot upwardly when the latch mechanism is disengaged. The seating of a child on the seat portion requires the latch mechanism to be retracted into the seat portion, which corresponds to the locking of the latch mechanism. The latch mechanism includes four helical spools rotated by the pivotal movement of the latch lever to cause linear movement of the locking pins into engagement with the base member. A latch indicator has a pre-latch sensor that indicates proper positioning of the seat member and a latch sensor that indicates an engagement of the locking pins. An indicator light illuminates when the seat member is properly latched.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
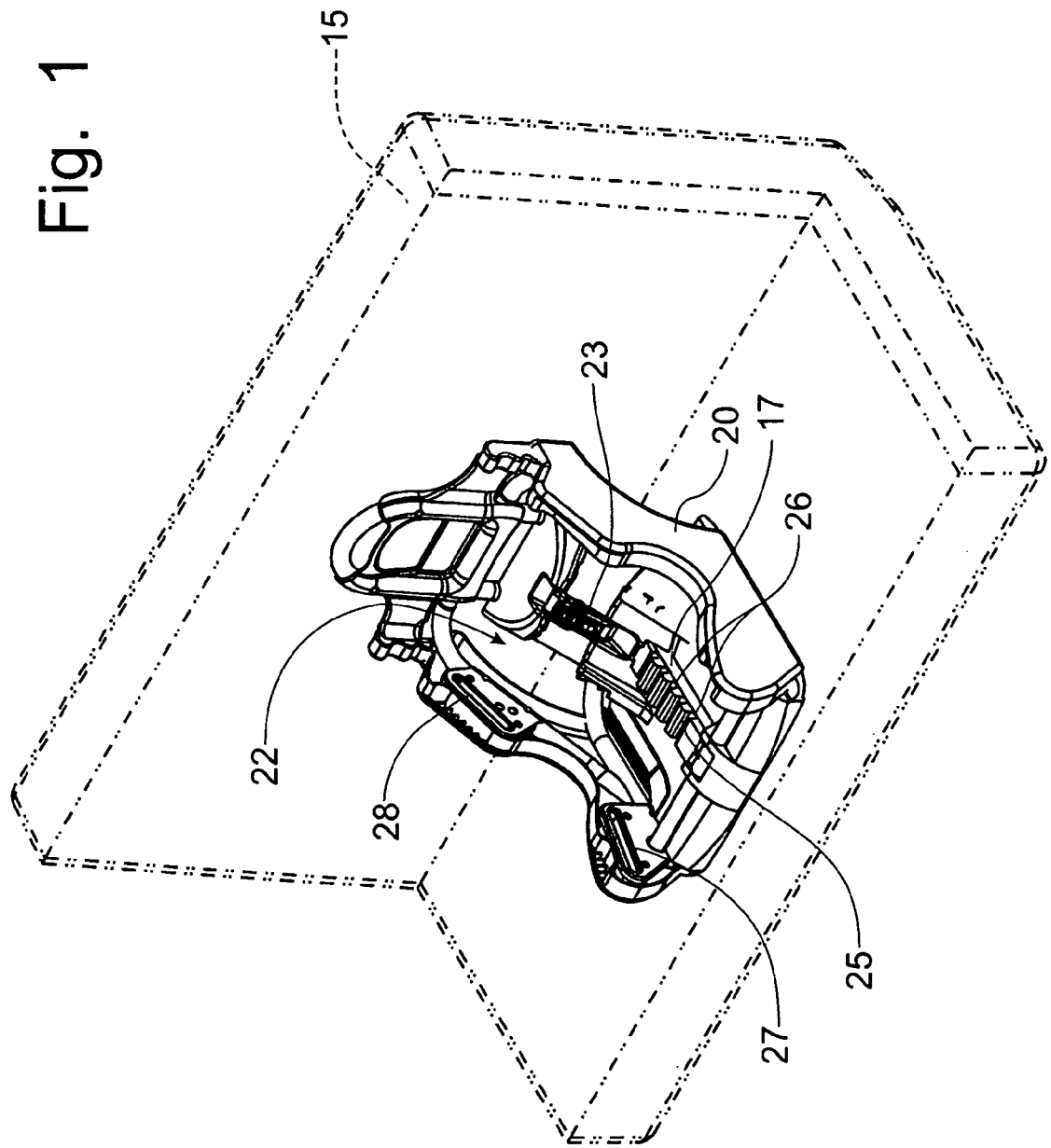
FIG. 1 is an upper, front perspective view of a base member, incorporating the principles of the instant invention, mounted on a representative vehicle seat, shown in phantom.

Referring now to FIGS. 1-10, a first embodiment of a car seat incorporating the principles of the instant invention can best be seen. The car seat 10 can be configured in a number of different positions, as is described in co-pending U.S. patent application Ser. No. 11/953,062, entitled "Reversible Child Car Seat with Separable Base Member", filed on Dec. 9, 2007, the contents of which are incorporated herein by reference. The car seat 10 is formed of a seat member 30 detachably mounted on a base member 20. As is best seen in FIG. 1, the base member 20 is a separate member that is affixed to a vehicle seat 15, representatively shown in phantom, by the seat belt of the vehicle. The vehicle seat belt is pulled through a first side opening 22, across a saddle bearing a seat belt latch member 23 and out through the second side opening 22 to be connected to the vehicle seat belt latch member (not shown) and pulled tight to capture the base member 20 on the vehicle seat 15. The seat belt latch member 23 secures the vehicle seat belt to the base member 20 and is selectively movable to release the vehicle seat belt from engagement with the base member 20.

The base member 20 is formed with a central rack member 25 having a plurality of parallel, horizontally disposed notches 26 to receive the recline apparatus, which include a transverse bar that rests in one of the notches 26, on the seat member 30 to change the position of the seat member 30 relative to the base member 20. The base member 20 is also formed with two pairs of opposing recline control slots 27, 28 into which retractable latch pins 57, 59, as will be describe in greater detail below, are engagable to secure the seat member 30 to the base member 20. The lower recline control slots 27 are positioned at a forward portion of the base member 20 and is oriented generally horizontally. The upper recline control slots 28 are located at a rearward portion of the base member 20, but are oriented at an inclined angle compared to the lower recline control slots 27. As a result, the rearward portion of the seat member 30 will lower as the forward portion of the seat member 30 moves forwardly to create a reclined orientation for the seat member 30. The upright configuration of the seat member 30, corresponding to the latch pins 57, 59 being positioned in the rearwardmost portions of the recline control slots 27, 28, is shown in FIG. 2.

Figure 2:
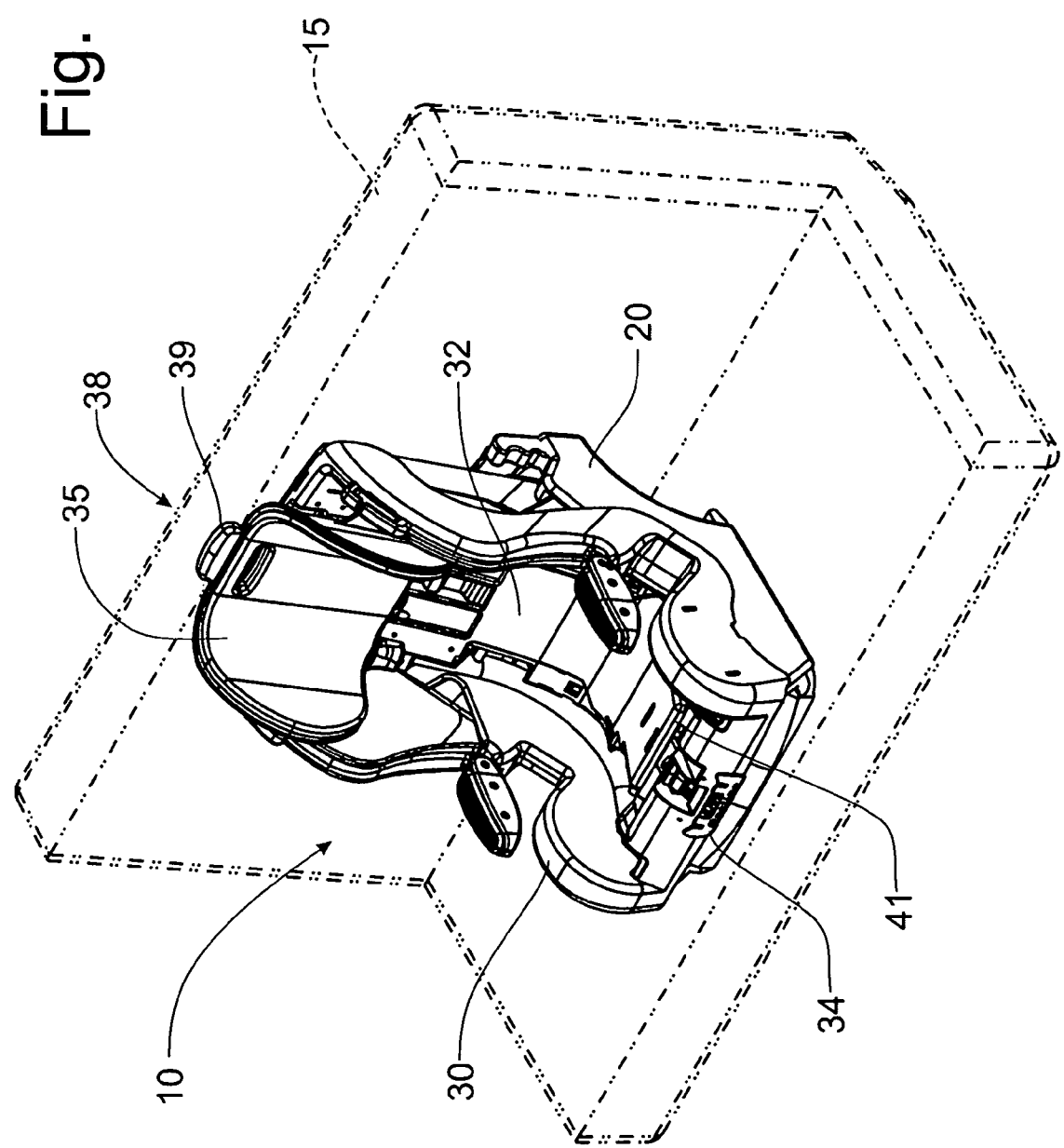
FIG. 2 is an upper, left front perspective view, similar to that of FIG. 1, but showing a seat member incorporating the principles of the instant invention mounted on the base member in a forward-facing orientation with the seat positioned in a fully upright position, the representative vehicle seat being shown in phantom.
Figure 3:
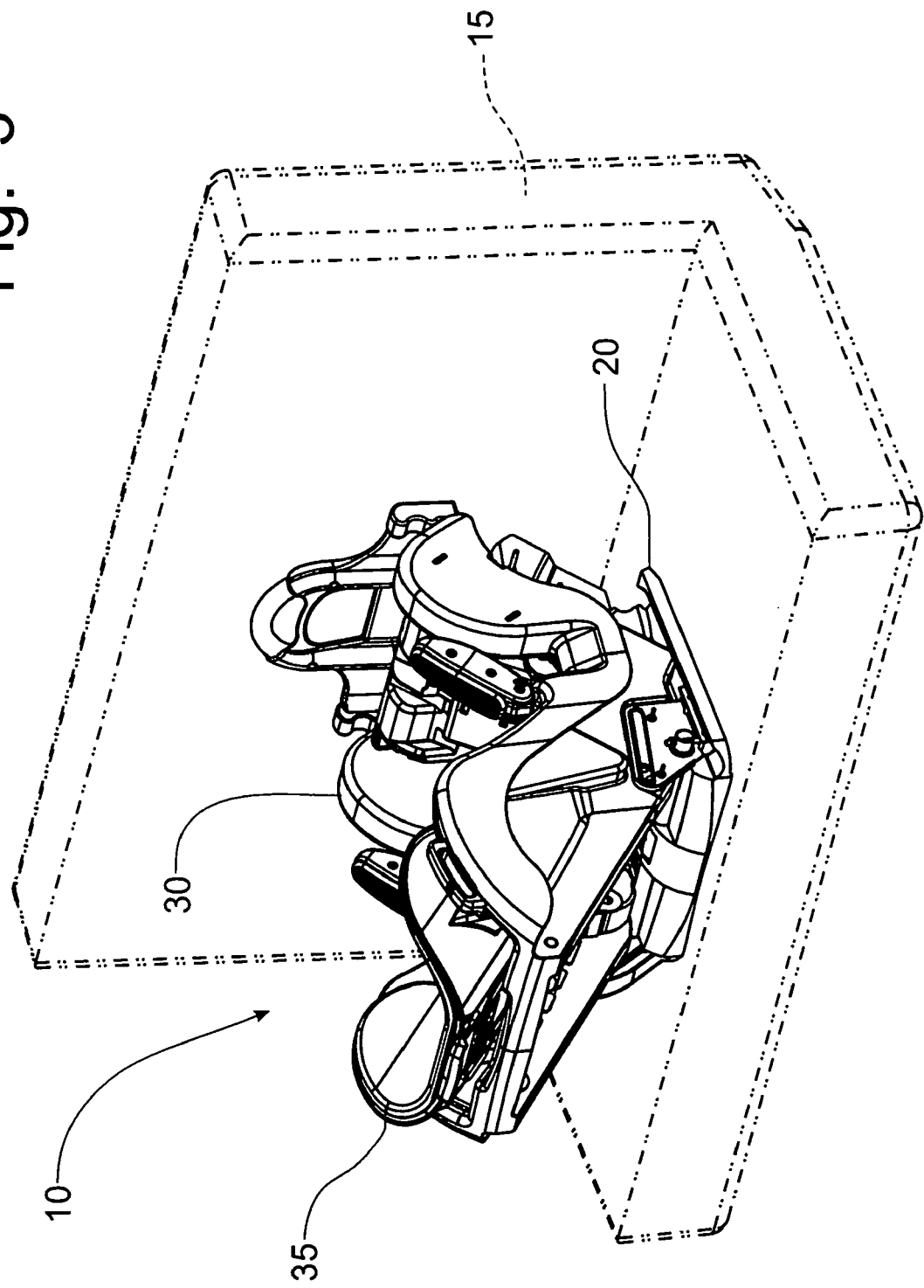
FIG. 3 is an upper, left front perspective view, similar to that of FIG. 2, but showing the seat member mounted on the base member in a rear-facing orientation, the representative vehicle seat being shown in phantom.

The seat member 30 can be mounted onto the base member 20 in either a forward-facing orientation, such as is depicted in FIG. 2, or in a rearwardly-facing orientation, as is shown in FIG. 3. The seat member 30 includes two pairs of latch members 57, 59 that are retractable in conjunction with the movement of the latch lever 41 at the bottom of the seat member 30. The movement of the latch lever 41, as will be described in greater detail below, is operable to cause a retraction of the latch pins 57, 59 into the seat portion 33 of the seat member 30 until the seat member 30 is properly positioned onto the base member 20, whereupon the latch pins 57, 59 are extended into the respective lower and upper recline control slots 27, 28 to trap the seat member 30 on the base member 20. The positioning of the seat member 30 onto the base member 20 places the recline apparatus into engagement with the recline rack 25 to prevent the latch members, or latch pins, 57, 59 from sliding along the corresponding recline control slots 27, 28 until the recline apparatus is released through manipulation of the recline actuator handle 34 to allow the latch pins 57, 59 to move within the recline slots 27, 28.

As seen in FIGS. 2-3, the seat member 30 includes a head rest 35 formed with slide members that are generally vertically movable along a curved, concave path along the seat back 32 defined by concave curved tracks formed on the back side of the seat back 32. Thus, as the head rest 35 is raised, the top portion of the head rest 35 moves inwardly toward the front of the seat member 30 providing a more upright back angle for the child as the child gets older and larger, requiring the upward movement of the head rest 35. The back portion of the seat member 30 has a control rack formed into the curved track and defining a plurality of vertically spaced notches corresponding to different vertical positions for the head rest 35. The head rest 35 is connected to a lock mechanism 38 that engages the control rack. The lock mechanism 38 includes a lock bar that rests in a selected notch and is spring-loaded into engagement with the control rack. An actuation handle 39 is operatively connected to a pivot lever on the lock mechanism 38 to force the lock bar out of engagement with the control rack to enable the head rest 35 to be moved vertically.

Figure 4:
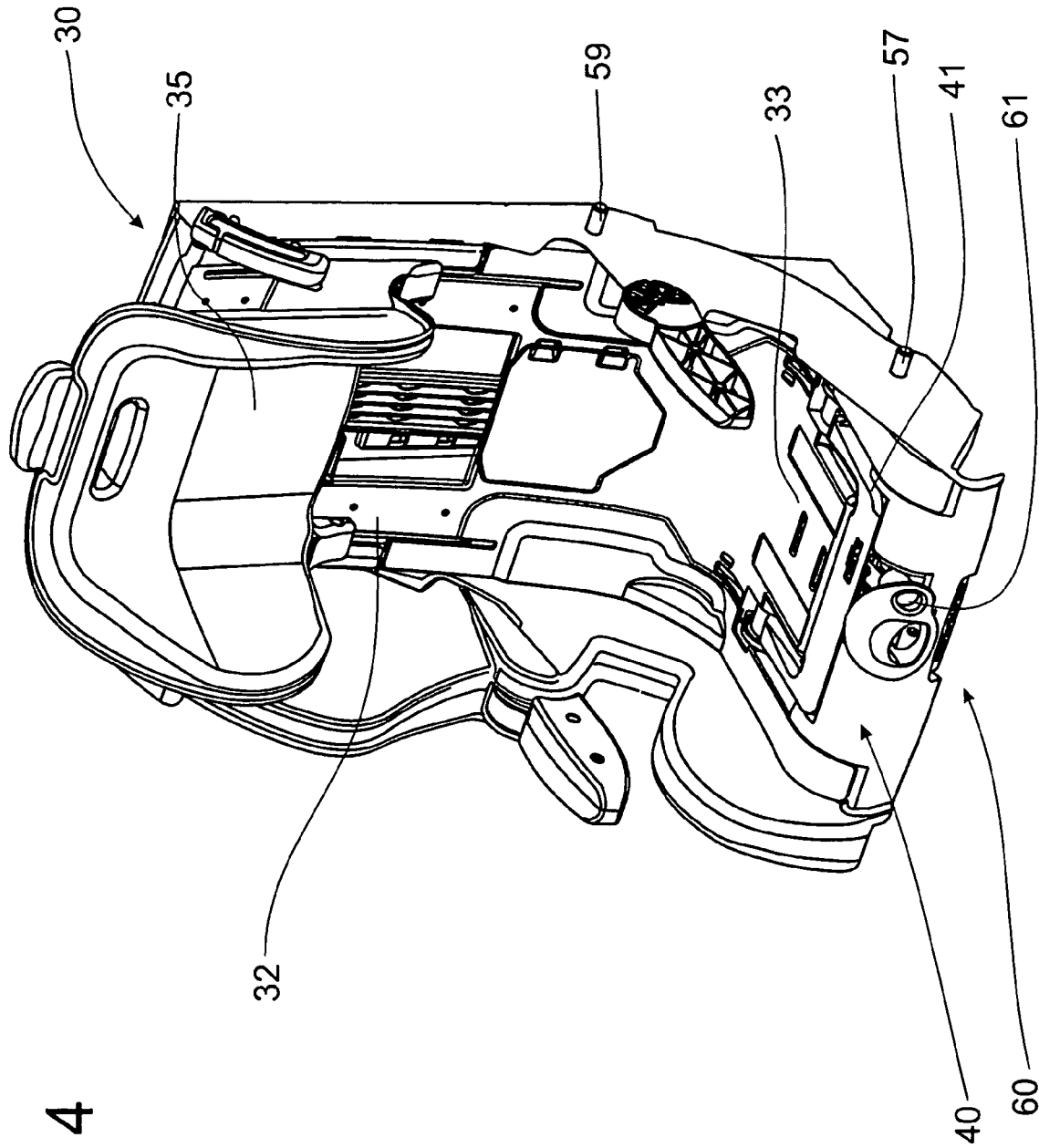
FIG. 4 is an upper, left front perspective view, similar to that of FIG. 2, but showing only a first embodiment of the seat member with a portion of the left side of the seat member being broken away to permit the locking pins to be shown, the latch lever in the seat portion being in the locked position.
Figure 5:
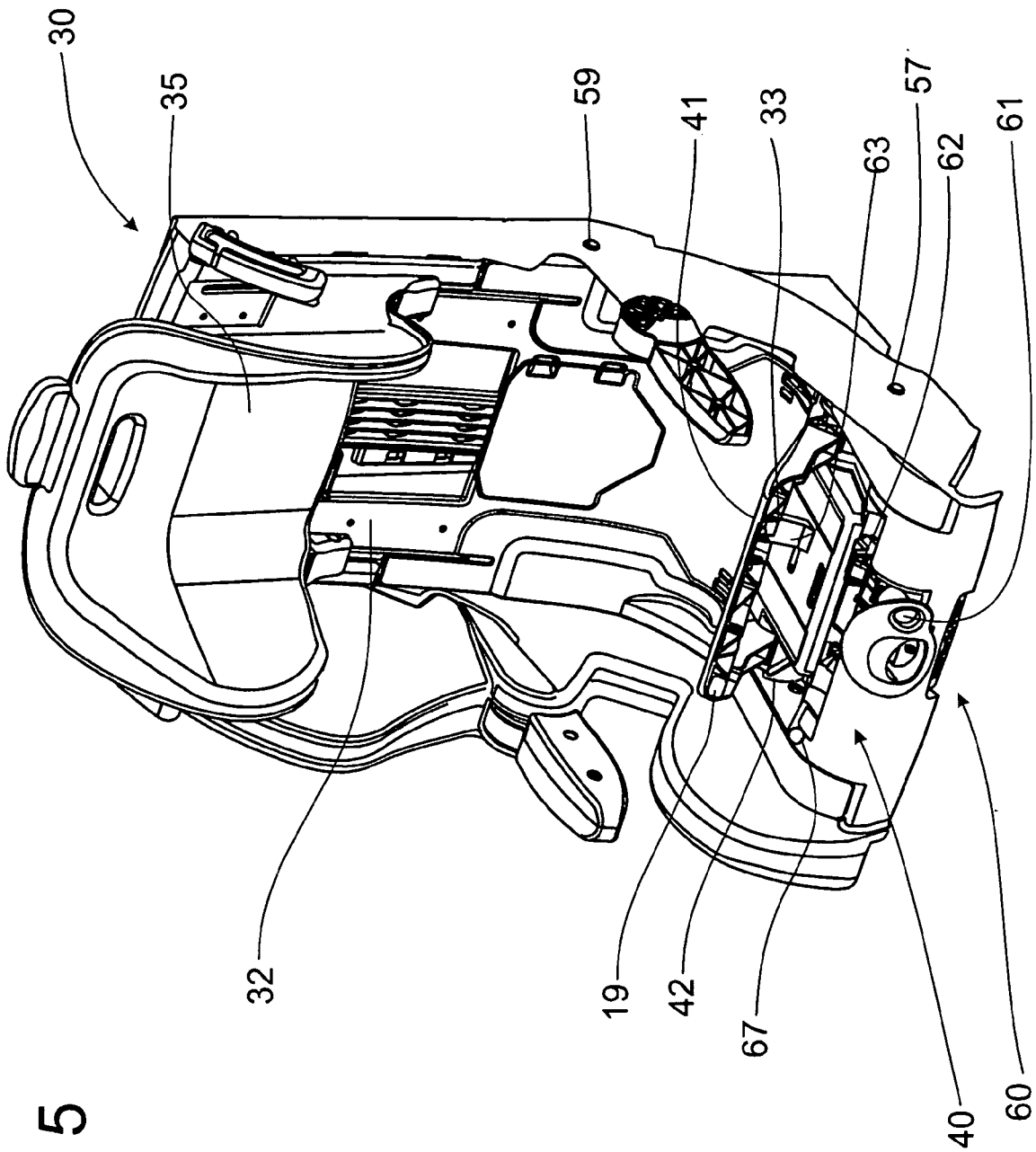
FIG. 5 is an upper, left front perspective view of the seat member shown in FIG. 4, the latch lever in the seat portion being in the unlocked position.
Figure 6:
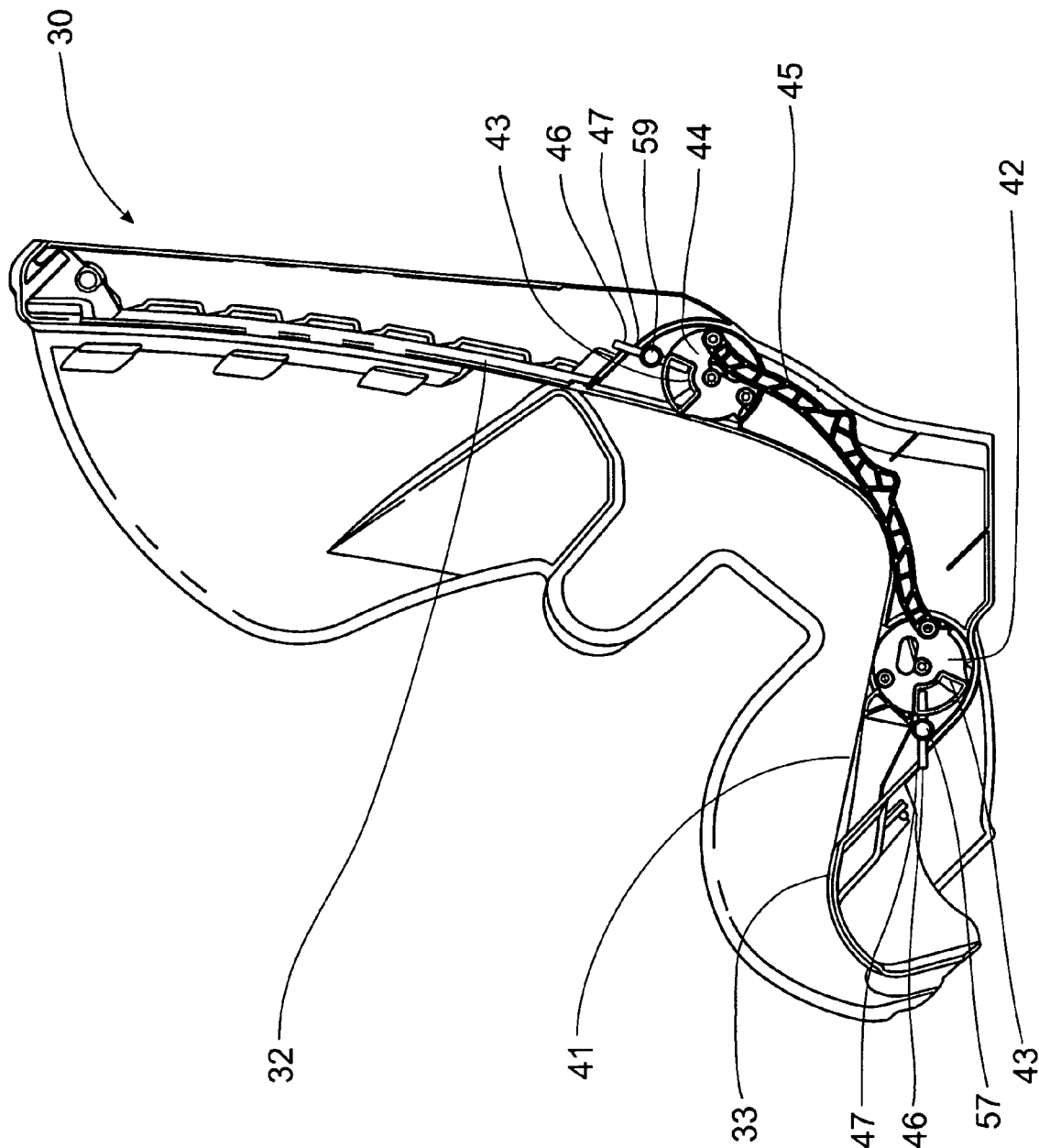
FIG. 6 is a cross-sectional view of the seat member shown in FIG. 4, taken inside the left side of the seat member to show the front and rear actuation spools on the left side of the seat member in the locked position.
Figure 7:
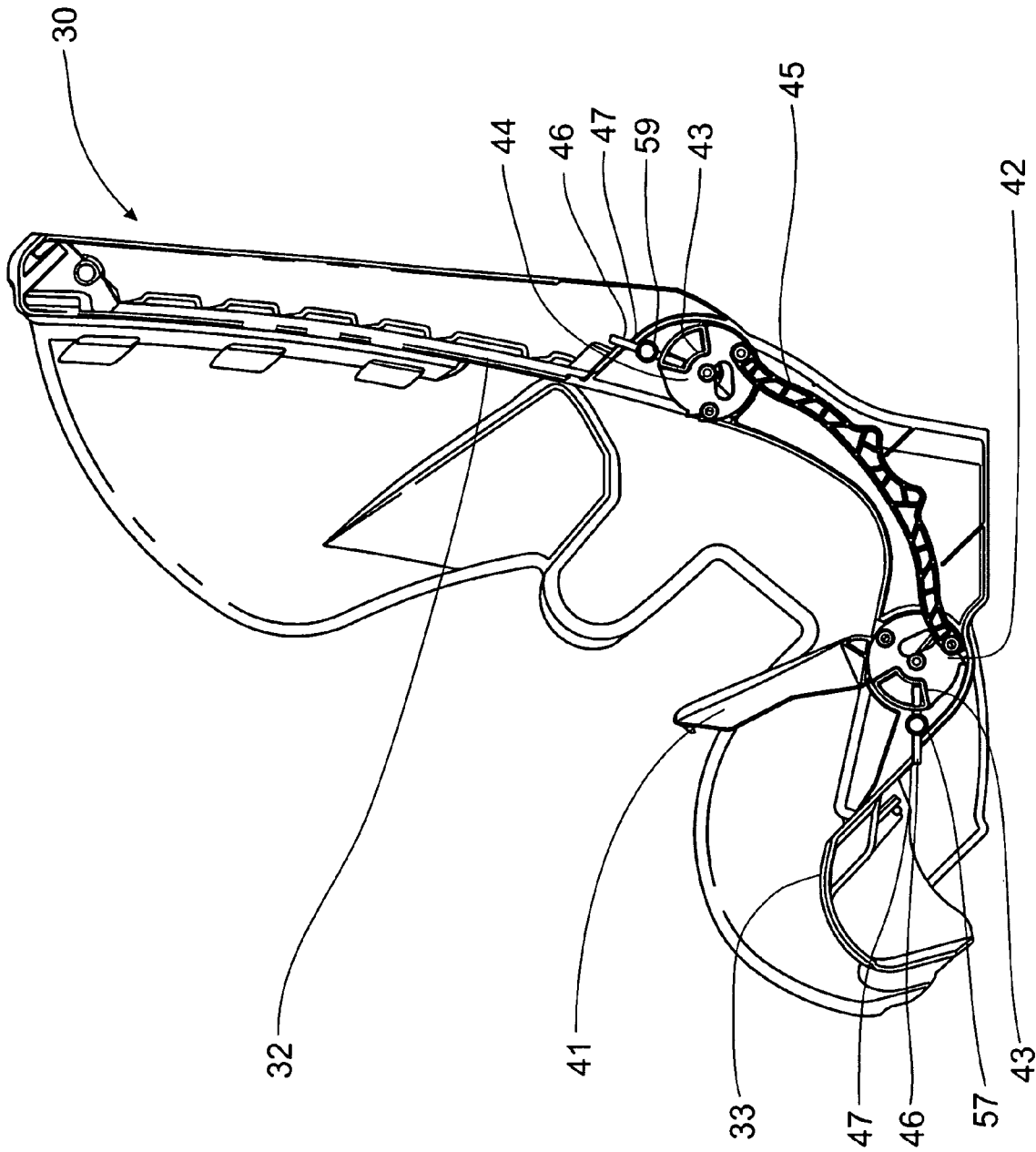
FIG. 7 is a cross-sectional view of the seat member shown in FIG. 5, taken inside the left side of the seat member to show the front and rear actuation spools on the left side of the seat member in the unlocked position.
Figure 8:
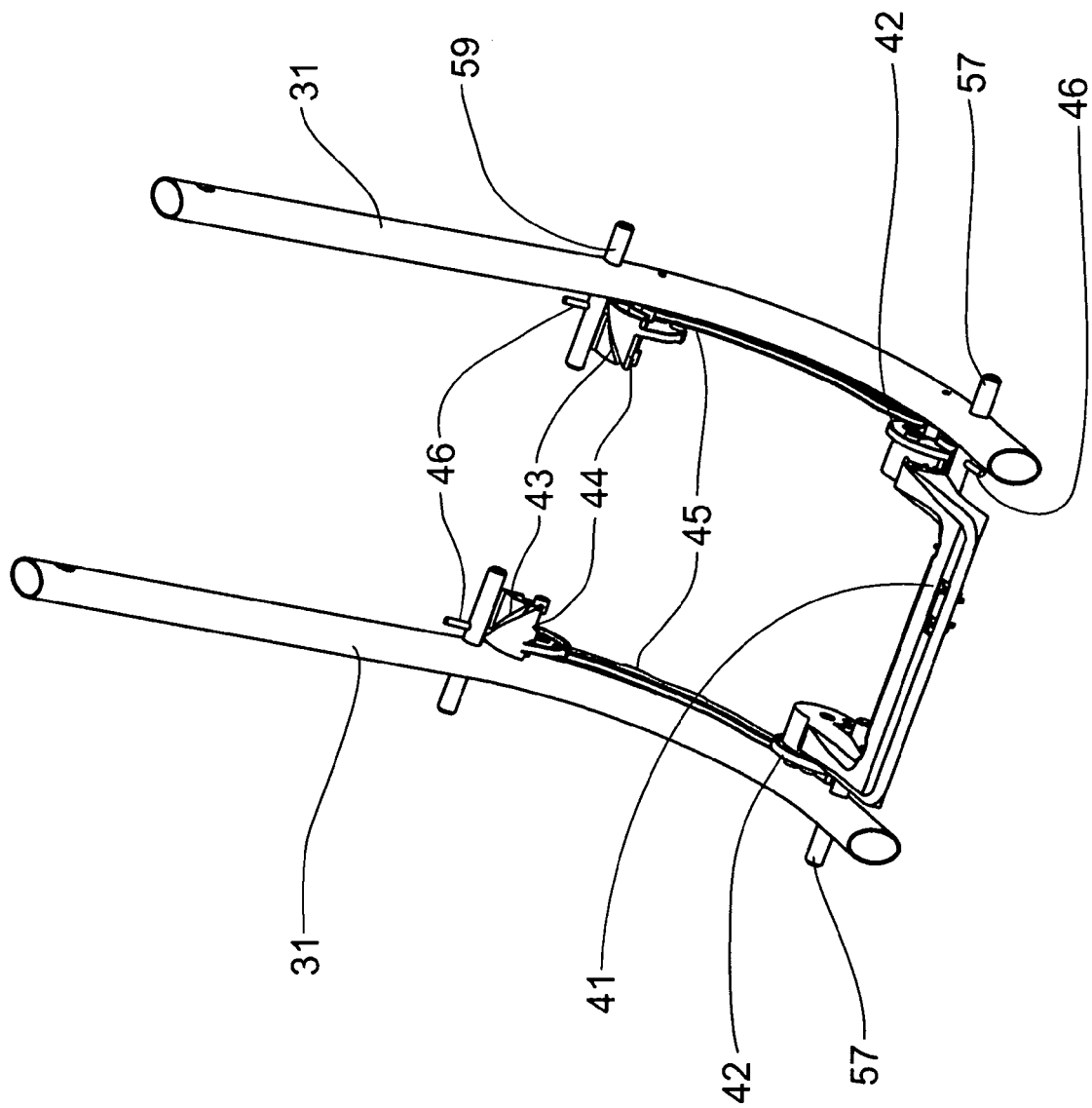
FIG. 8 is a perspective view of the locking mechanism mounted in the frame tubes of the seat member, the locking mechanism being shown in the locked position.
Figure 9:
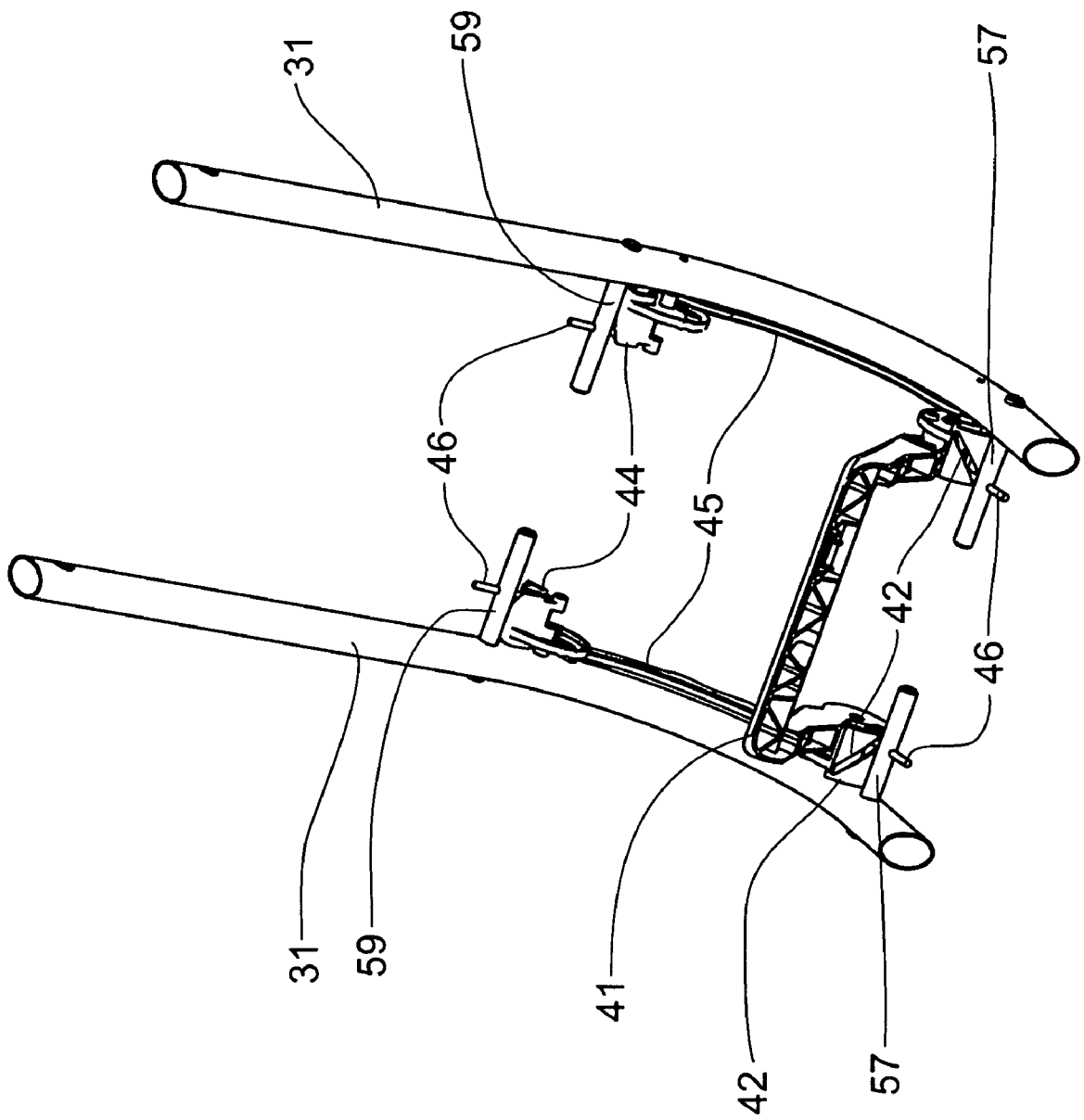
FIG. 9 is a perspective view of the locking mechanism mounted in the frame tubes of the seat member, the locking mechanism being shown in the unlocked position.
Figure 10:
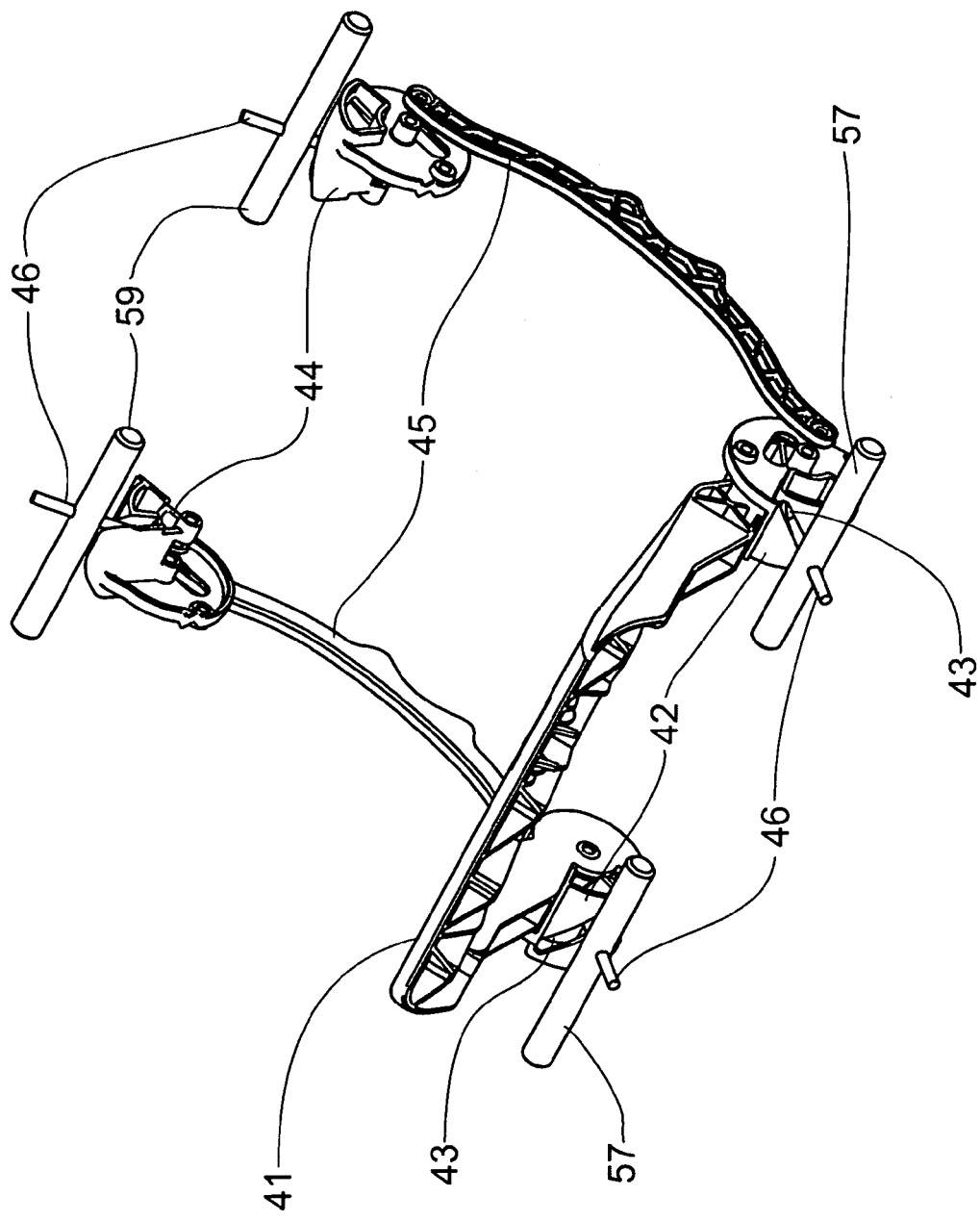
FIG. 10 is an enlarged perspective view of the locking mechanism shown in the unlocked position.
Figure 11:
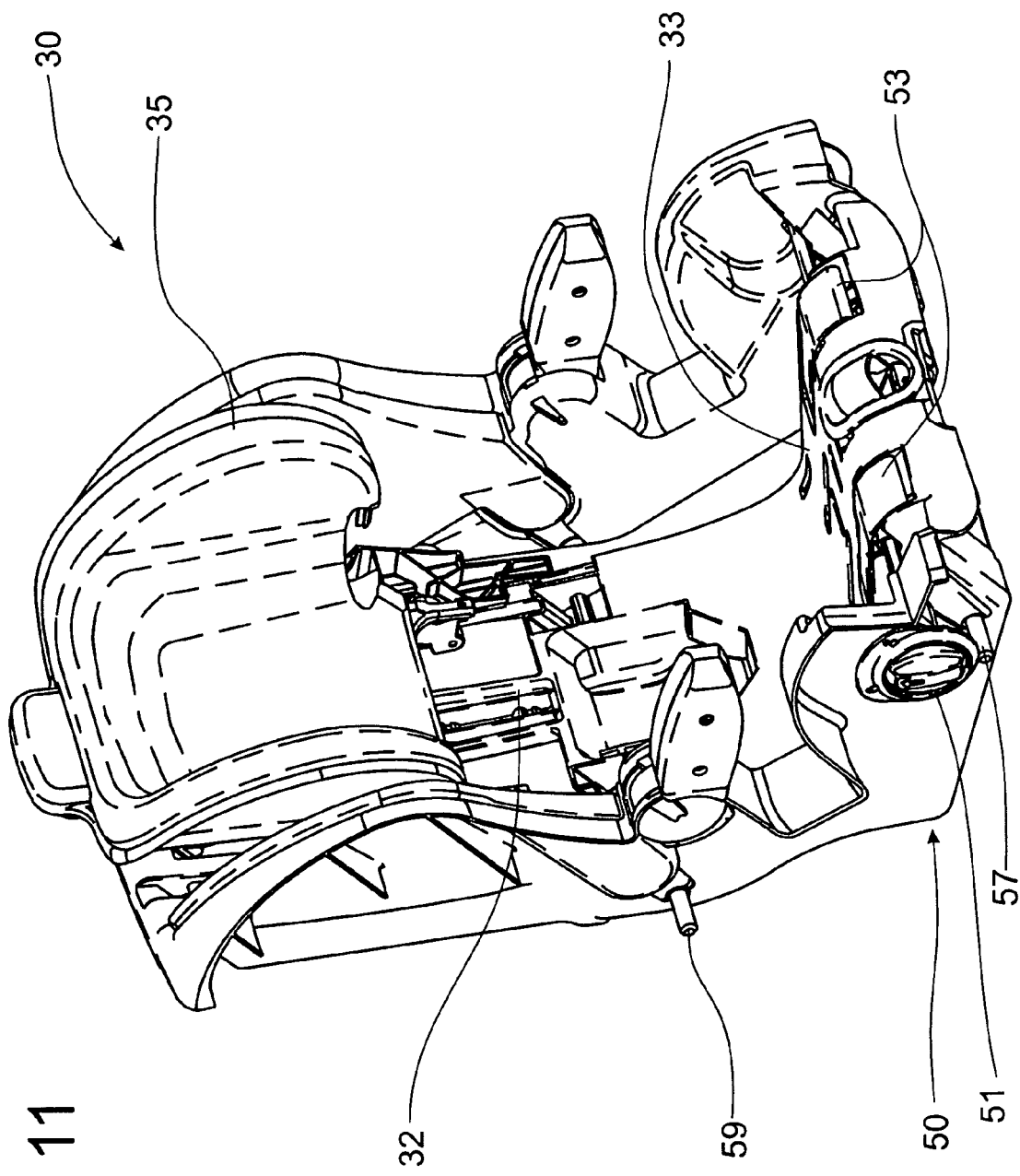
FIG. 11 is an upper, right front perspective view, similar to that of FIG. 4, but showing a second embodiment of the seat member with a portion of the left side of the seat member being broken away to permit the locking pins to be shown, the locking mechanism being in the locked position.
Figure 12:
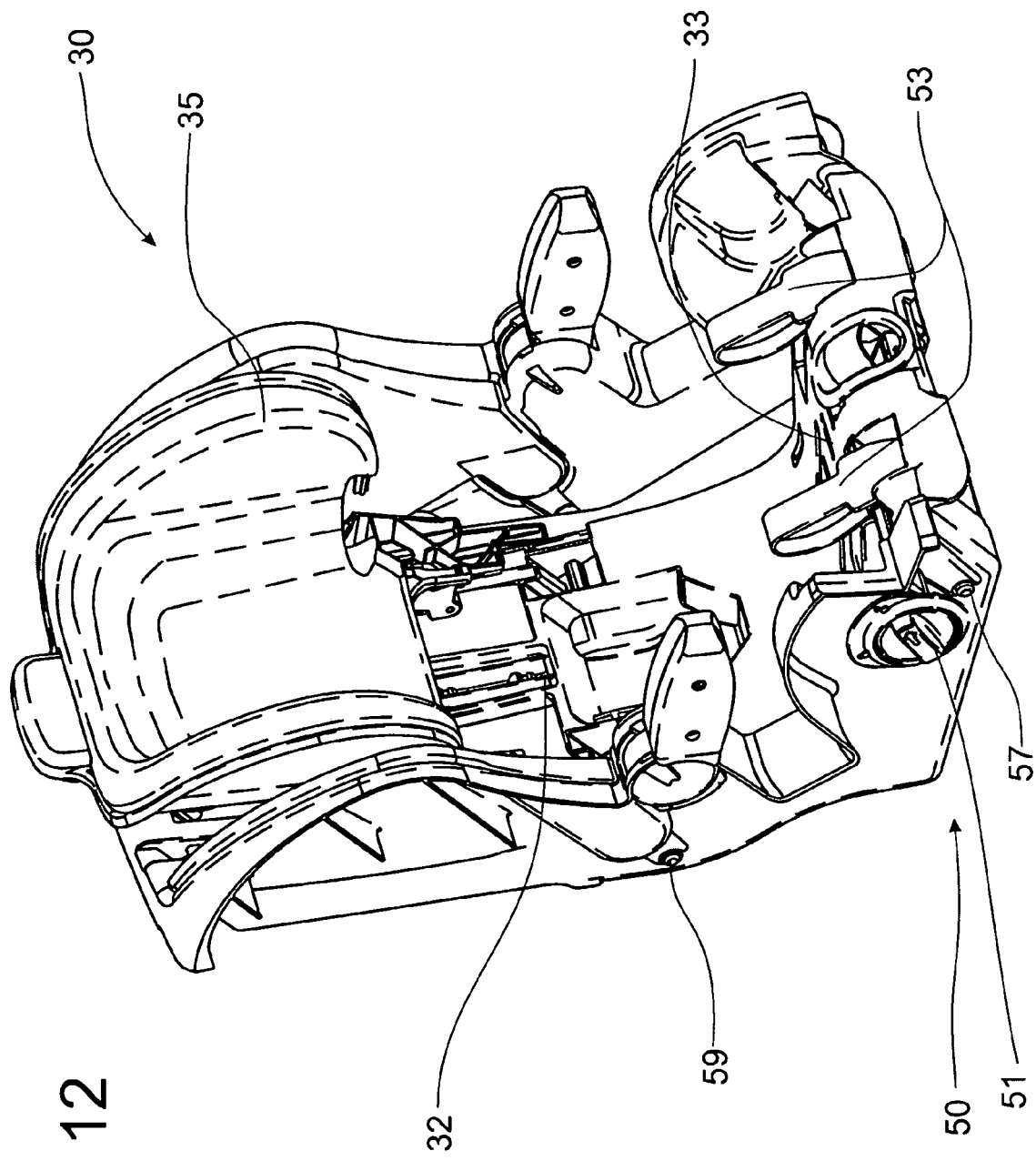
FIG. 12 is an upper, right front perspective view of the seat member shown in FIG. 11, the locking mechanism being in the unlocked position.
Figure 13:
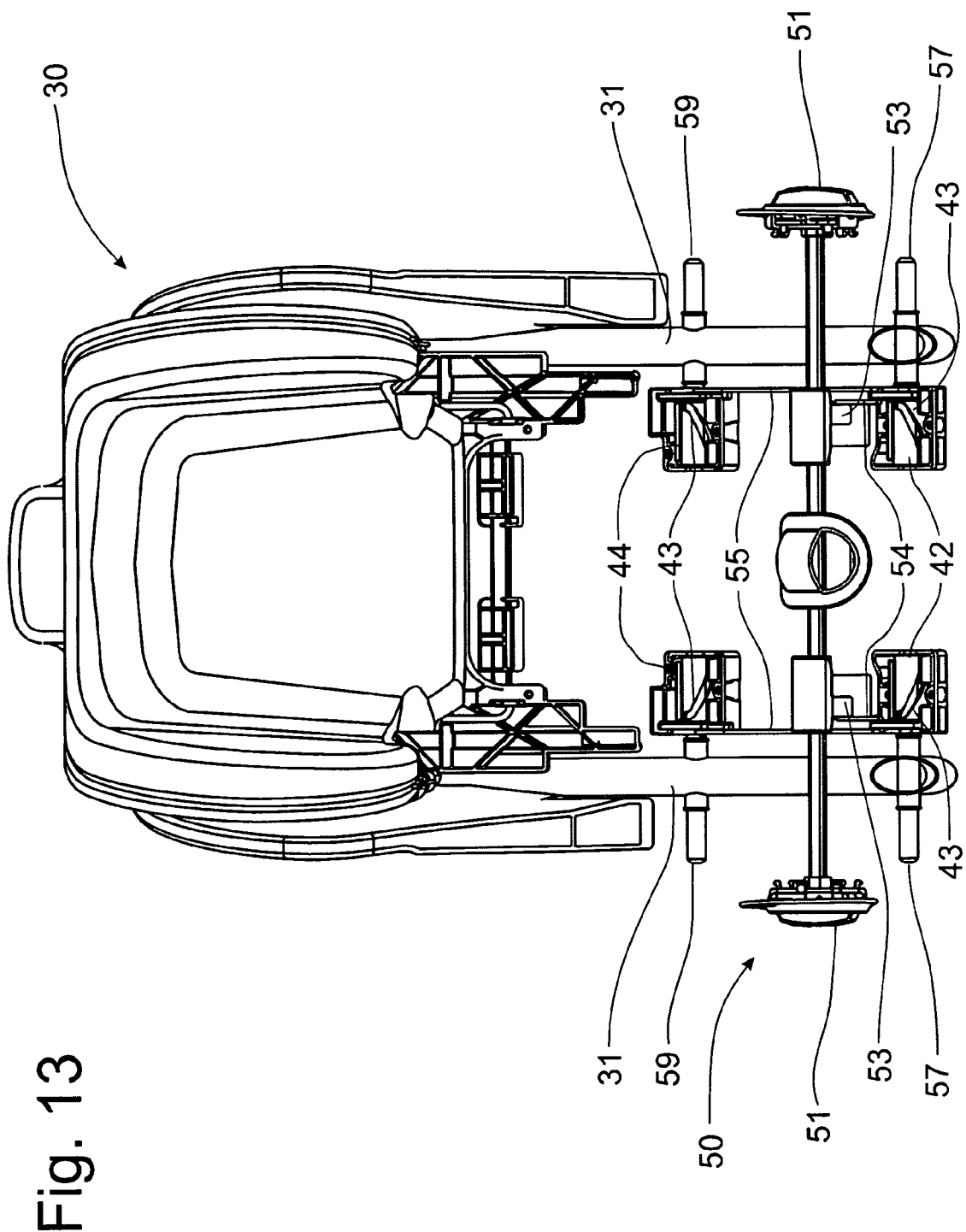
FIG. 13 is a front elevational view of the seat member with most of the seat member broken away to show the locking mechanism in the locked position.
Figure 14:
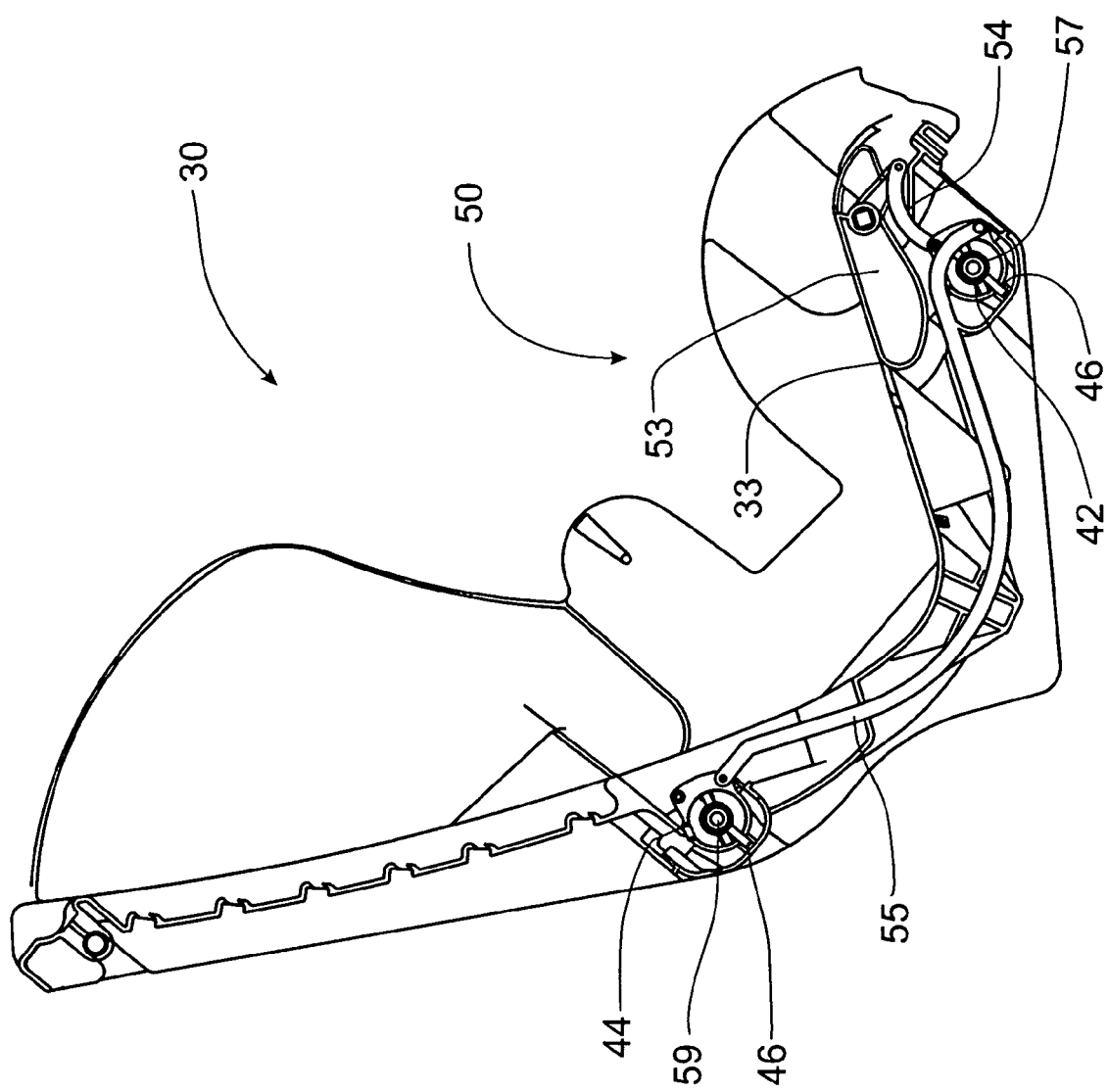
FIG. 14 is a cross-sectional view of the seat member shown in FIG. 11, taken inside the right side of the seat member to show the front and rear actuation spools on the right side of the seat member in the locked position.
Figure 15:
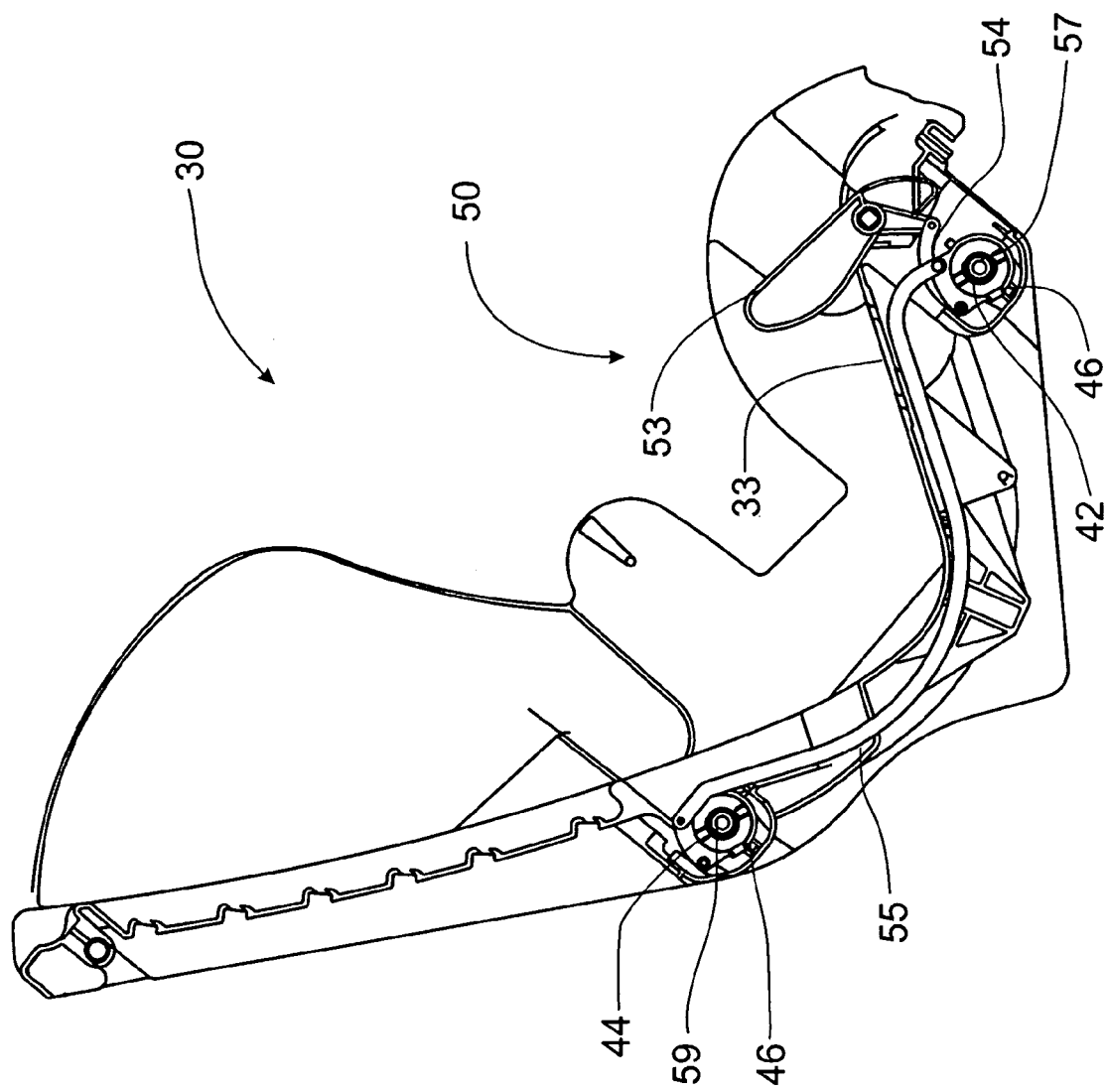
FIG. 15 is a cross-sectional view of the seat member shown in FIG. 12, taken inside the right side of the seat member to show the front and rear actuation spools on the right side of the seat member in the unlocked position.
Figure 16:
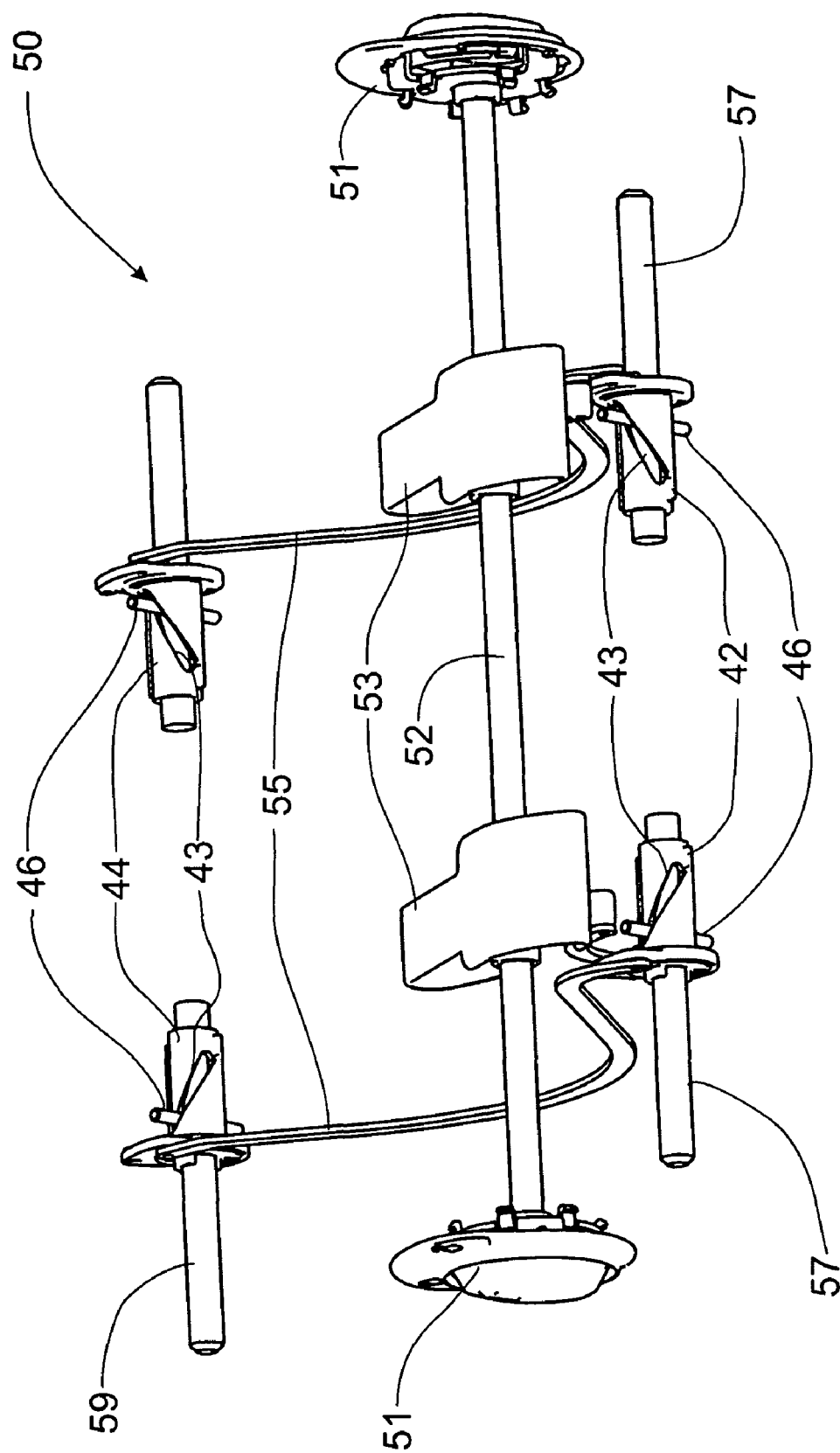
FIG. 16 is an enlarged perspective view of the second embodiment of the locking mechanism.

The first embodiment of the latch mechanism 40 for the seat member 30 is best seen in FIGS. 4-10. The latch lever 41 is recessed into the seat portion 33 to form a smooth surface with the adjacent seat portion 33 structure when the latch lever 41 is moved into the locked position, as depicted in FIG. 4. To move the locking pins 57, 59 out of the recline slots 27, 28, the latch lever 41 is raised, as indicated in FIG. 5 to affect actuation of the latch mechanism 40. The latch lever 41 is connected to a pair of opposing front actuator spools 42 arranged in mirror image on opposite sides of the seat member 30. Each front actuator spool 42 is rotatably supported in the housing of the seat member to be rotated about a generally horizontal, transversely extending axis of rotation. Similarly, a pair of opposing rear actuator spools 44 is rotatably supported within the housing of the seat member 30 for rotational movement about a horizontal, transverse axis of rotation parallel to the axis of rotation for the front actuator spools 42. Each of the actuator spools 42, 44, is formed with a helical slot 43 on the circumference thereof. The helical slots 43 on the left side of the seat member 30 being oriented in a mirror image compared to the helical slots on the right side of the seat member 30. A connecting link 45 along each side of the seat member 30 transfers rotational motion from the front actuator spool 42 to the corresponding rear actuator spool 44 so that the pivotal movement of the latch lever 41 causes simultaneous movement of the front and rear spools 42, 44.

Each actuator spool 42, 44 carries an actuator pin 46 that is engaged with the respective helical slot 43 and extends through the corresponding latching pin 57, 59. The free end of the actuator pin 46 is positionally controlled by being placed into engagement with a linear slot 47 formed in the housing of the seat member 30. The result of the rotation of the actuator spools 42, 44, caused by the pivotal movement of the latch lever 41, is that the latch pins 57, 59 are moved linearly in opposing transverse directions, due to the mirrored arrangements of the helical slots 43. To provide further stability for the latch pins 57, 59, the latch pins 57, 59 can be supported for linear movement through the frame tubes 31 forming part of the structure of the seat member 30. The movement of the latch lever 41 upwardly out of the seat portion 33 of the seat member 30 affects a retraction of the latch pins 57, 59 out of the base member 20 and into the seat member 30 so that the seat member 30 can then be removed from the base member 20.

When the seat member 30 is disengaged from the base member 20, it would be desirable that the child not be present in the car seat 10. By requiring the latch lever 41 to be raised up out of the structure of the seat portion 33, the child cannot be seated on the seat portion 33, thus assuring that the child has been removed from the car seat 10. Furthermore, by placing the latch lever 41 under the child seated on the seat portion 33 of the car seat 30, the child cannot accidentally unlock the seat member 30 from the base member 20.

The second embodiment of the latch mechanism 50 is structurally different from, though operates similarly to, the first embodiment of the latch mechanism 40. The actuator knobs 51 are positioned on the sides of the seat member 30 for convenient access by the caregiver. The actuator knobs 51 are affixed to a transverse actuator shaft 52 that extends through the seat member 30 and interconnects the opposing actuator knobs 51. Mounted on the actuator shaft 52, which is formed with at least one flat thereon, are a pair of pivoted flags 53 that are recessed within the seat portion 33, as noted above with respect to the latch lever 41. Thus, when the actuator knobs 51 are rotated to affect operation of the latching mechanism 50, the pivot flags 53 will pop upwardly out of the seat portion 33 when the latching mechanism 50 is moved into an unlocked position. As with the first embodiment of the latch mechanism 40, the second embodiment of the latch mechanism 50 cannot be operated if the child is present on the seat portion 33 as the child would interfere with the pivotal movement of the flags 53.

An actuation link 54 interconnects the respective pivot flags 53 and the front or lower actuation spools 42. As with the first embodiment of the latch mechanism 40, the front and rear actuation spools 42, 44 are interconnected by a connector link 55 so that the rotation of the front spools 42 is transferred directly to cause rotation of the rear spools 44. The latch pins 57, 59 are mounted on the axis of the corresponding actuation spools 42, 44 so that the actuation pins 46 pass through the actuation spool 42, 44, engaged with the corresponding helical slot 43 and also pass through the latch pins 57, 59. The front and rear ends of the actuation pins 46 are restrained within linear slots (not shown) in the housing of the seat member 30 to prevent the actuation pins 46 from rotating with the actuation spools 42, 44. As a result, the latching pins 57, 59 will move transversely linearly with the rotation of the actuation spools 42, 44 affected by the rotation of the actuation knobs 51 transferred through the actuation link 54.

Figure 17:
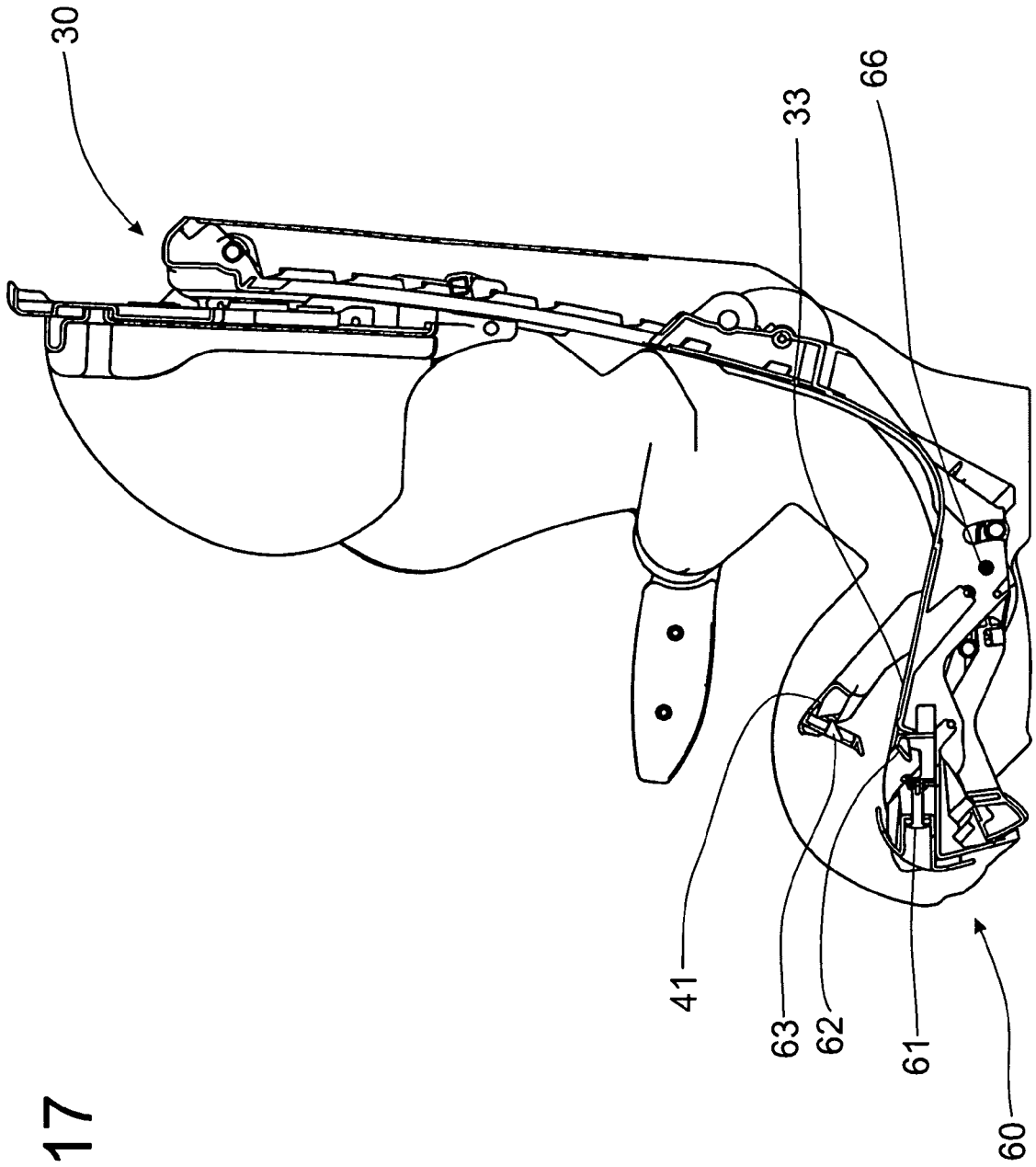
FIG. 17 is a cross-sectional view of the first embodiment of the seat member taken near the center line of the seat member to show a secondary lock apparatus associated with the latch lever, the spring-loaded release button being shown in the depressed release position that allows the latch lever to be raised to affect an unlocking of the seat member from the base member.
Figure 18:
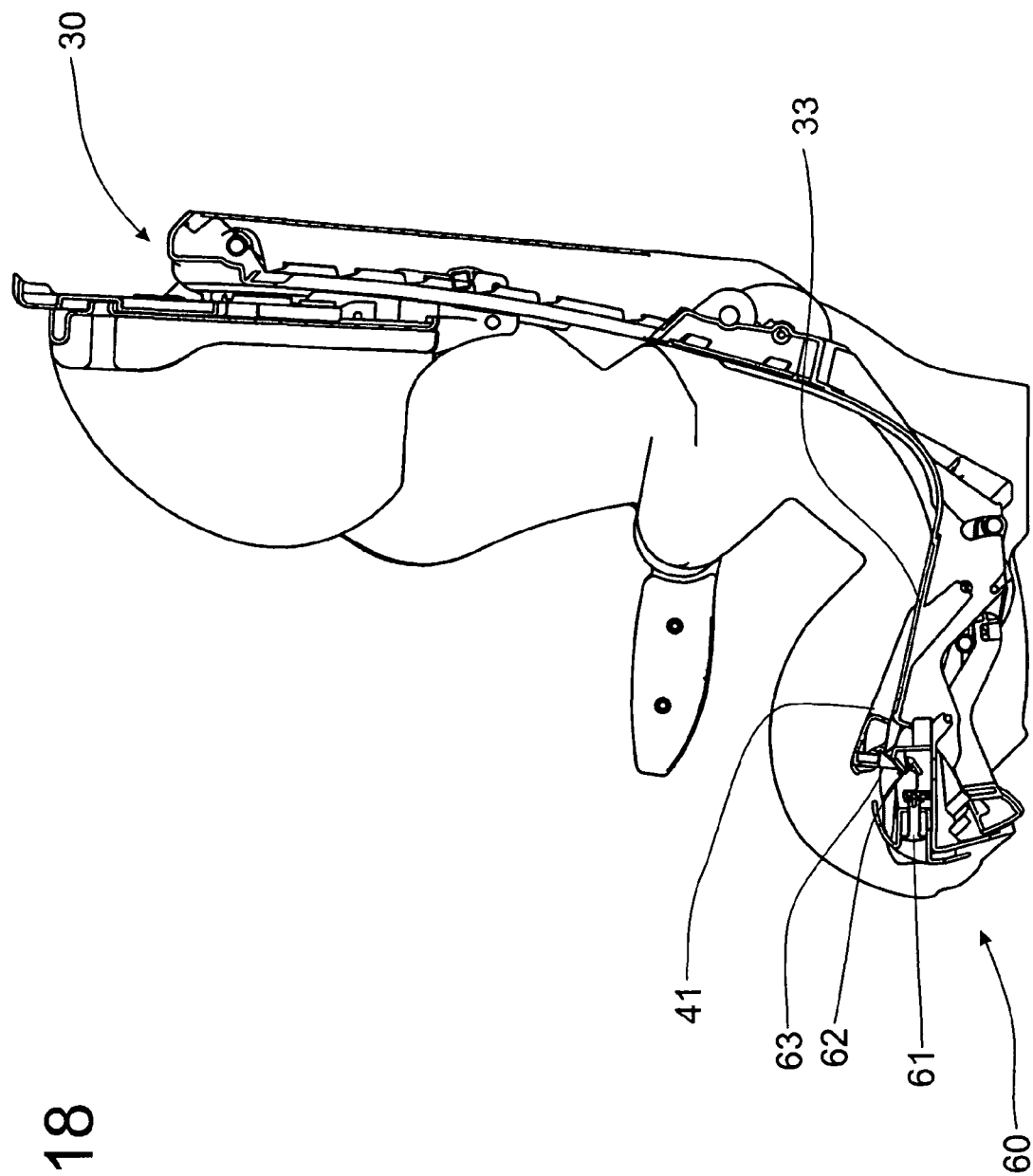
FIG. 18 is a cross-sectional view similar to that of FIG. 17, but showing the latch lever being lowered to engage the secondary lock apparatus to deflect the spring-loaded release button and permit the latch lever to be locked into the locked position.
Figure 19:
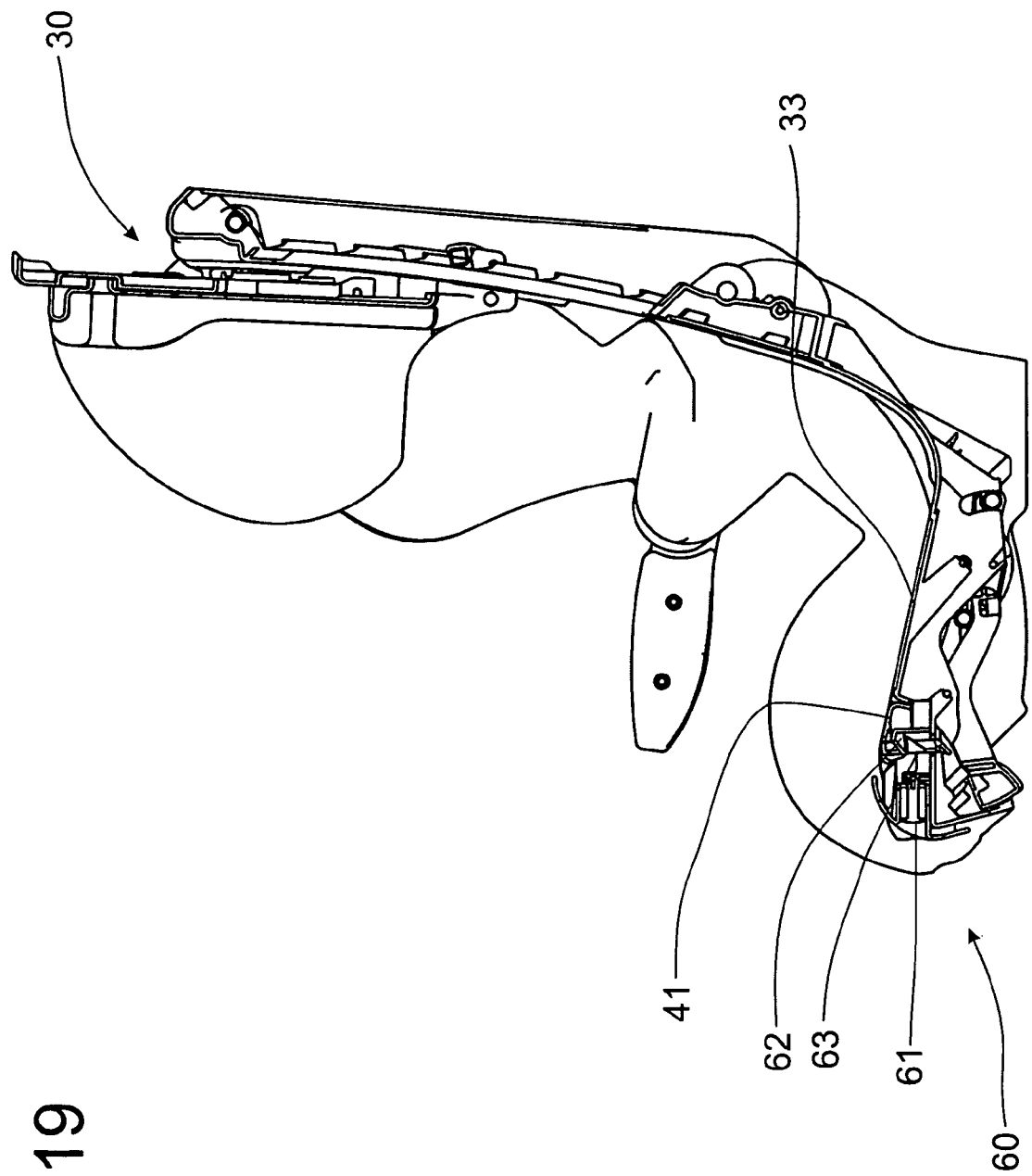
FIG. 19 is a cross-sectional view similar to that of FIG. 18, but showing the latch lever locked into the locked position by the secondary lock apparatus.
Figure 20:
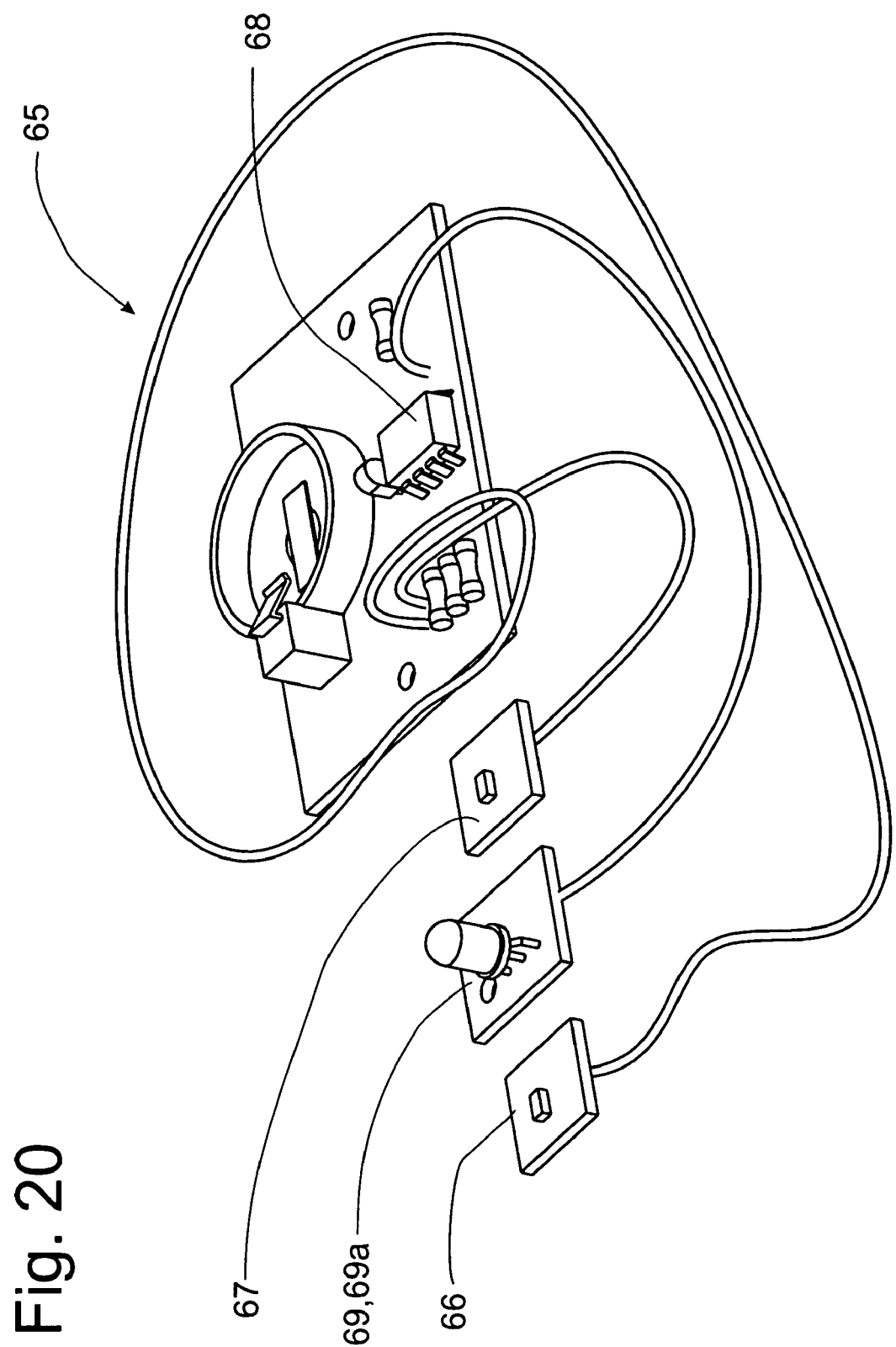
FIG. 20 is a perspective view of the electronic latch indicator incorporating the principles of the instant invention.
Figure 21:
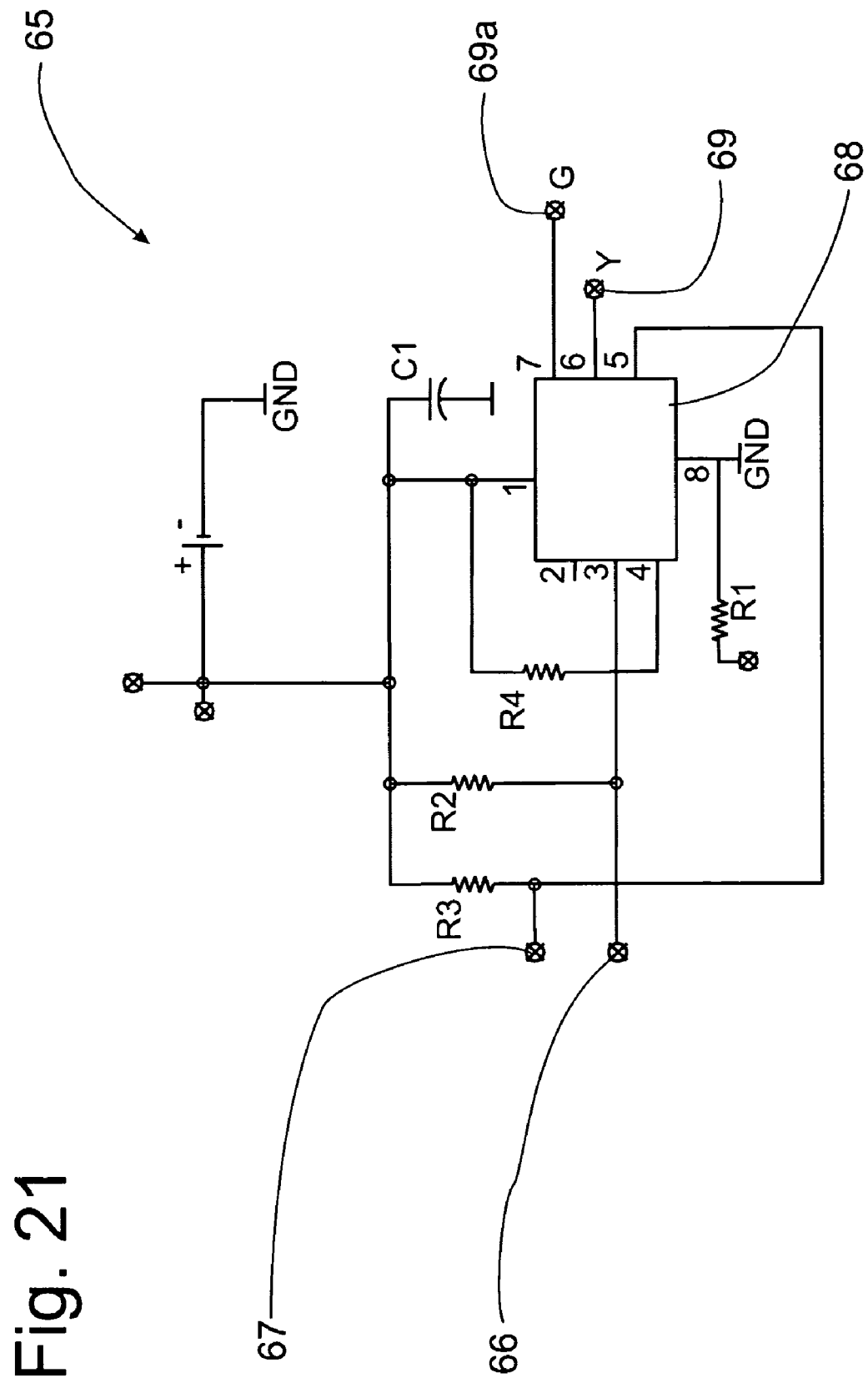
FIG. 21 is a schematic wiring diagram of the electronic latch indicator shown in FIG. 20.

A secondary lock apparatus 60 may be desired to control the movement of the latching mechanism 40, 50. Such as secondary lock apparatus 60 is shown in FIGS. 17-19 in conjunction with the first embodiment of the latch mechanism 40; however, the secondary lock apparatus 60 could also be operatively coupled to the flags 53 in the second embodiment of the latch mechanism 50. Preferably, the secondary lock apparatus 60 is located at the front of the seat portion 33 so as to easily accessible by the caregiver when manipulation of the latch mechanism 40, 50 is desired. The secondary lock apparatus 60 includes a spring-loaded release button 61 that has a latch keeper 62 affixed thereto for movement in a fore-and-aft direction.

As best seen in FIGS. 17-19, the latch lever 41 includes a downwardly depending latch hook 63 that engages the latch keeper 62 when the latch lever 41 is moved into the locked position recessed into the seat portion 33, as can be seen in FIG. 18. Both the latch keeper 62 and the latch hook 63 are formed with mating cam surfaces that are operable when the latch lever 41 is lowered to retract the latch keeper 62 rearwardly against the bias force exerted by the spring-loaded release button 61. Once the cam surface on the latch hook 63 slides below the cam surface of the latch keeper 62, the biasing force of the spring-loaded release button 61 pulls the latch keeper 62 forwardly to trap the latch hook 63 beneath the cam surface of the latch keeper 62, as is shown in FIG. 19. To release the latch lever 41, the release button 61 is depressed against the spring force to move the latch keeper 62 rearwardly behind the latch hook 63 so that the latch lever 41 can be freely pivoted upwardly.

One skilled in the art will readily recognize that a similar secondary lock apparatus 60 could be provided for use with the pivoted flags 53 to secure the second embodiment of the latch mechanism 50 in the locked position until the release button 61 is depressed to allow the flags 53 to be pivoted, along with the corresponding rotation of the actuation shaft 52.

With the utilization of the latch mechanism 40, 50 to secure the seat member 30 onto the base member 20, a positive indicator of proper engagement of the latch mechanism 40, 50 with the base member 20 is desirable. One positive indicator system can be found in the electronic latch indicator 65 shown in FIGS. 5, 17, 20 and 21. A central processor 68 can be located at any suitable location within the housing of the seat member 30 that has an open void that will receive the central processor 68 with interference or exposure to impact. The central processor 68 has a prelatch sensor 66 and a latch sensor 67, both of which are proximity sensors that detect the close proximity of a magnetic strip 17, 19 and generate a signal in response to the sensing of the magnetic strip 17. That positive signal is preferably in the form of a yellow LED 69 and a green LED 69a, which are positioned at a visible place on the forward part of the seat portion 33.

The prelatch sensor 66 is preferably located near the recline mechanism underneath the seat member 30 so as to be placed into close proximity to the central rack 25 on the base member 20. Since the magnetic strip 17 cannot be located on top of the central rack 25 due to the movement of the recline mechanism into and out of engagement with the notches 26 in the central rack 25, the magnetic strip 17 is preferably placed along the sides of the central rack 25, one on each side of the central rack. Accordingly, the prelatch sensor 66 would be offset to one side of the center line of the seat member 30. Thus, the magnetic strip 17 placed on both sides of the central rack 25 allows the prelatch sensor 66 to be operable to sense the proximity of the magnetic strip 17 irrespective of whether the seat member 30 is positioned in a front-facing orientation or a rear-facing orientation.

The latch sensor 67 is preferably located in conjunction with the latch lever 41 in the first embodiment of the latching mechanism 40 or in conjunction with the pivoted flags 53 in the second embodiment of the latch mechanism 50. The magnetic strip 19 is preferably mounted on the pivoted latch component 41, 53, while the latch sensor 67 is located in the seat portion 33 adjacent to where the magnetic strip 19 would be positioned when the latch lever 41 or the pivoted flags 53 are in the locked and recessed positions within the top surface of the seat portion 33. Thus, when the latch mechanism 40, 50 is moved into the locked position, the latch sensor 67 will generate a signal indicative of the latch mechanism 40, 50 being in the locked position. If for some reason the latch pins 57, 59 cannot pass through the recline slots 27, 28, the pivoted component 41, 53 cannot move into the recessed position within the seat portion 33 and, thus, the latch signal would not be generated.

In operation, the placement of the seat member 30 onto the base member 20 will locate the prelatch sensor 66 adjacent one of the magnetic strips 17 and generate a signal indicative of the seat member 30 being properly oriented on top of the base member 20. When the prelatch sensor 66 comes within range of the magnetic strip 17, a yellow LED 69 will flash a predetermined number of times and then go into a "sleep mode" waiting for the latch sensor 67 to be activated. When the latch sensor 67 is within range of the magnetic strip 19, indicating that the latch mechanism 40, 50 has been placed into the locked position, a green LED 69a will be illuminated for a predetermined length of time, for example, ten seconds, to provide a positive indication that the seat member 30 is properly latched into a secure position on the base member 20. When the seat member 30 is to be removed from the base member 20, the pivoted component 41, 53 is raised to remove the magnetic strip 19 from the proximity of the latch sensor 67. As a result, the central processor 68 awakens and flashes the yellow LED 69 a predetermined number of times. The removal of the seat member 30 will then result in the central processor 68 going back into a "sleep mode" until one of the sensors 66, 67 is again activated.

If the seat member 30 is not installed onto the base member 20 properly and the magnetic strip 17 is never within range of the prelatch sensor 66, which means that the seat member 30 is not properly seated on the base member 20, it is still possible to move the pivoted component 41, 53 into the locked position, e.g. the latch pins 57, 59 ride over top of the base member 20. The central processor 68 will not show any illumination of a light as neither of the sensors 66, 67 have been activated within the normal sequence. The failure to obtain a positive feedback in the form of an illuminated LED 69, 69a will be the indicator that the seat member 30 is not safely installed.

Figure 22:
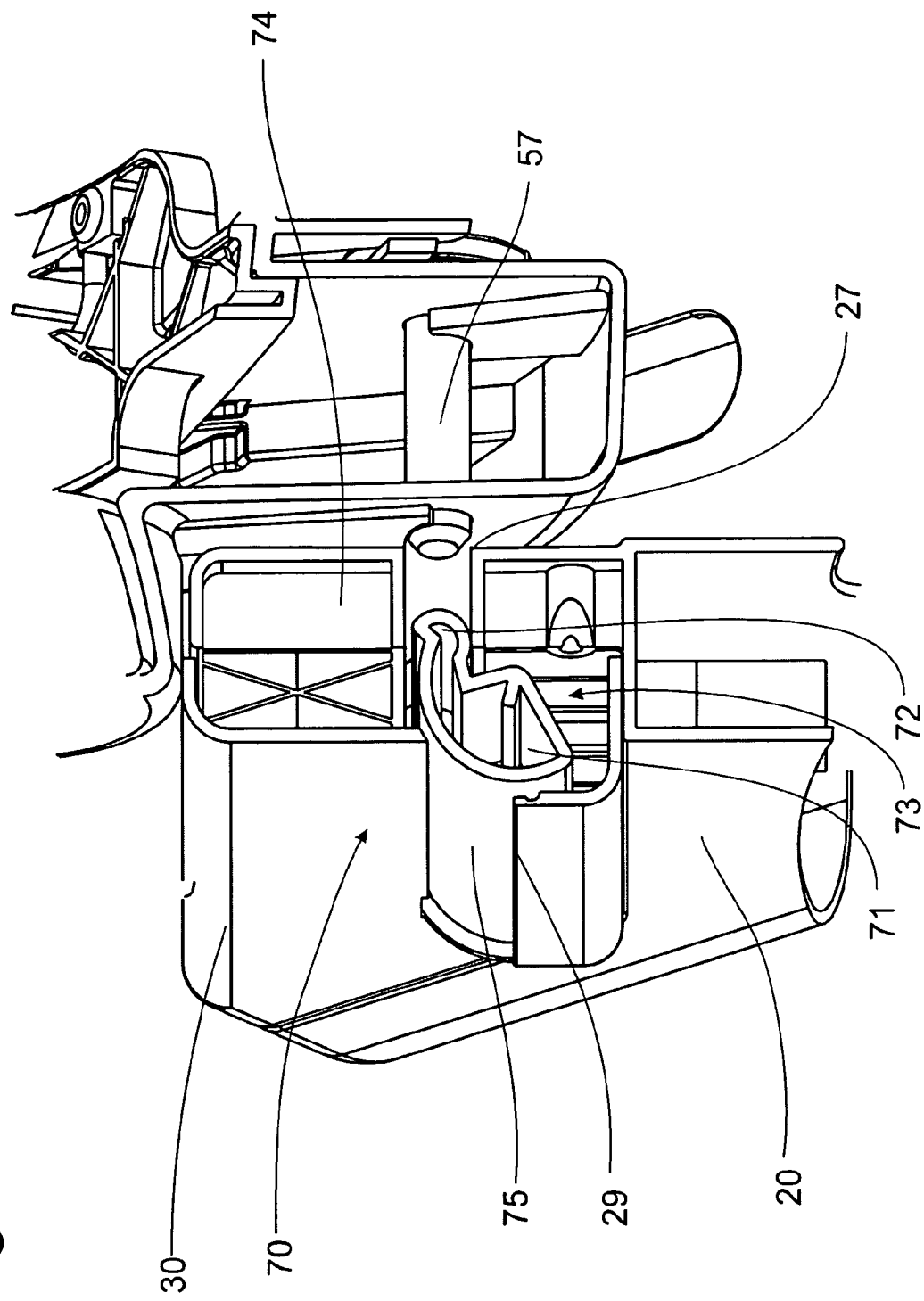
FIG. 22 is a partial cross-sectional view of the car seat to depict a mechanical embodiment of the latch indicator, the pivoted member being disengaged from the corresponding locking pin to expose a surface providing an indication of the seat member being in the released position.
Figure 23:
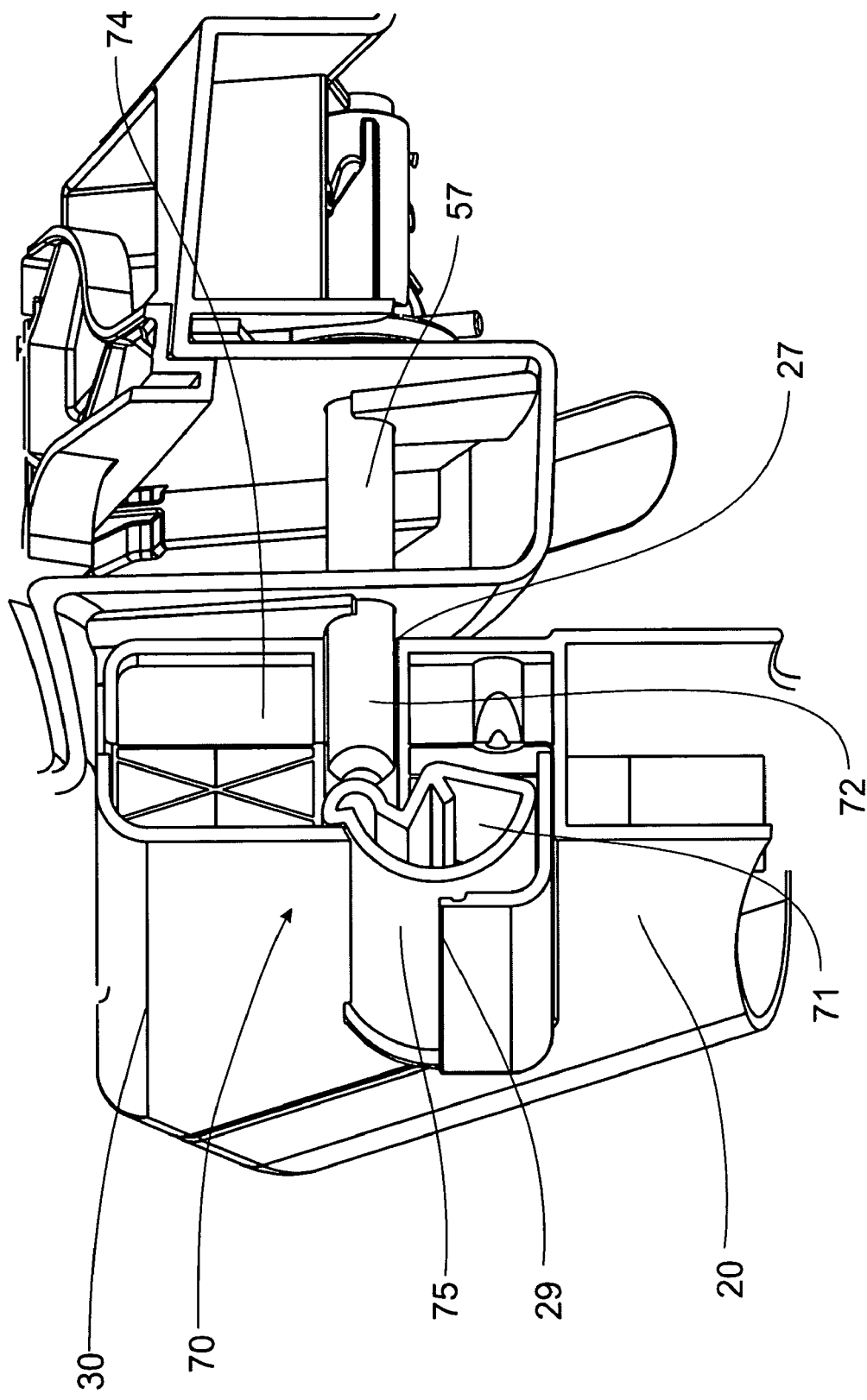
FIG. 23 is a partial cross-sectional view of the car seat similar to that of FIG. 22, but showing the pivoted member engaged by the corresponding locking pin to pivot into a position that exposes a different surface to provide a positive indication that the locking pain is properly engaged with the recline slot to secure the seat member onto the base member.

A mechanical version of the latch indicator 70 is depicted in FIGS. 22 and 23. While only one latch indicator 70 is shown in FIGS. 22 and 23, one skilled in the art will recognize that a similar latch indicator 70 would be provided at each of the recline slots 27, 28, as shown in FIG. 1 for example, to provide a positive indicator of a proper latching of the seat member 30 onto the base member 20, as will be described in greater detail below. The base member 20 is formed with a recline slot 27 that opens into a pocket 74 formed in the side portion of the base member 20. In this pocket 74, a pivoted member 71 is supported such that an exterior side thereof is exposed through an opening 29 formed in the base member. The pivoted member 71 is rotatable in place about a central axis of rotation, and includes an engagement end 72 that is positionable in alignment with the recline slot 27. The pivoted member 71 is spring-biased by the spring 73 to be pivoted into a position as depicted in FIG. 22 with the engagement end 72 being stopped against the recline slot 27 and the exposed surface 75 showing a red colored surface 75 through the opening 29 to provide an indication that the locking pin 57 has not yet been moved into the locked position that will secure the seat member 30 onto the base member 20.

When the locking pin 57 has been moved as described above to project into the recline slot 27, the distal end of the locking pin 57 contacts the engagement end 72 of the pivoted member 71 and forces a rotation of the pivoted member 71 against the spring bias exerted on the pivot member 71. This rotation of the pivoted member 71 causes the red colored surface 75 to rotate below the opening 29 and expose instead a green colored surface 75 that is located adjacent the red colored surface 75. One skilled in the art will recognize that the choices of red and green colored surfaces are a matter of preference and can be formed in other configurations, including a word indicator that simply says locked and unlocked, or the equivalent.

Locating the pivoted member 71 in the pocket 74 where the pivoted member 71 can only be engaged by the locking pin 57 if the seat member 30 is properly positioned on the base member 20 provides the prelatch function of the latch indicator. The latch function is accomplished by the engagement of the locking pin 57 into the pivoted member 71 to force the rotation thereof to expose a differently marked exterior surface 75 to be visible through the opening 29 in the side of the base member 20.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A car seat for transporting a child in a vehicle, comprising:
    a base member connectable to a vehicle seat;
    a seat member detachably connectable to said base member, said seat member having a seat portion on which said child is positioned when utilizing said car seat;
    a locking apparatus movable between a locked position interengaged between said base member and said seat member to secure the seat member to said base member and a released position to permit said seat member to be removed from said base member, said locking apparatus including first and second longitudinally spaced locking pins linearly movable between said locked and released positions and a connecting link interconnecting said first and second locking pins; and
    an actuation apparatus operably connected to said locking apparatus to effect with said connecting link simultaneous movement of said first and second locking pins between said locked and released positions.

2. The car seat of claim 1 wherein said first and second locking pins are transversely oriented, said actuation apparatus being operatively connected to one of said first and second locking pins to affect transverse movement thereof between said locked and released positions, said connecting link extending longitudinally to interconnect said first and second locking pins being operable to cause said first and second locking pins to move simultaneously.

3. The car seat of claim 2 wherein said first and second locking pins form a portion, respectively, of front and rear locking devices, each of said front and rear locking devices comprises:
    a pair of opposing rotatable spools, each spool being formed with a helical slot;
    one of said locking pins associated with each said spool and being movable between said locked position and said released position; and
    an actuation pin engaged with each respective said helical slot and with the corresponding said locking pin to affect linear movement of said locking pin between said locked and released positions in response to a rotational movement of said spool.

4. The car seat of claim 3 wherein each said locking pin is aligned with an axis of rotation of the corresponding said spool, the corresponding said actuation pin passing through said locking pin to be engagable with linear slots in said seat member on opposing sides of said spool to confine movement of said actuation pin into a linear direction.

5. The car seat of claim 4 wherein said actuation apparatus includes an actuation knob affixed to a transverse actuation shaft and a drive link transferring rotational movement of said actuation shaft to each said front spool.

6. The car seat of claim 5 wherein said actuation apparatus further includes a pair of flag members mounted on said actuation shaft and being located on said seat portion, said flag members being recessed into said seat member when in said locked position and pivoted upwardly when in said released position, said drive links interconnecting said flag members and a corresponding said rotatable spool.

7. A car seat for transporting a child in a vehicle, comprising:
    a base member connectable to a vehicle seat;
    a seat member detachably connectable to said base member, said seat member having a seat portion on which said child is positioned when utilizing said car seat;
    a locking apparatus movable between a locked position interengaged between said base member and said seat member to secure the seat member to said base member and a released position to permit said seat member to be removed from said base member, said locking apparatus including first and second locking pins linearly movable between said locked and released positions;
    an actuation apparatus operably connected to said locking apparatus to affect simultaneous movement of said first and second locking pins between said locked and released positions; and
    a latch indicator showing both a movement of said locking device into said locked position and a proper positioning of said seat member on said base member.

8. The car seat of claim 7 wherein said indicator comprises:
    a prelatch sensor cooperable with said seat member and said base member to indicate said proper positioning of said seat member on said base member;
    a latch sensor cooperable between said actuation apparatus and said seat member to indicate the movement of said locking device into said locked position; and
    an indicator to show the indication of both said prelatch and said latch sensors.

9. The car seat of claim 8 wherein both said prelatch sensor and said latch sensor are proximity sensors that produce a signal indicative of a magnetic member being within a sensing range of said proximity sensors, said indicator being an LED.

10. The car seat of claim 9 wherein a first magnetic member is positioned on said base member to be cooperable with said prelatch proximity sensor mounted on said seat member, a second magnetic member being located on said actuation apparatus to be cooperable with said latch sensor mounted on said seat member, said LED indicator being operative to flash a first signal representative of said prelatch proximity sensor coming into sensing range of said first magnetic member, and to flash a second signal representative of said latch proximity sensor coming into sensing range of said second magnetic member after said first signal has been demonstrated.

11. The car seat of claim 7 wherein said latch indicator comprises:
    a pivot member rotatable about an axis of rotation and being located to be engaged by one of said locking pins to affect rotation thereof when said locking pin is moved into said locked position.

12. The car seat of claim 11 wherein said locking pins are supported on said seat member, said base member including openings therein alignable, respectively, with a corresponding said locking pin, said pivot member being located on said base member such that the movement of the corresponding said locking pin engages said pivot member when engaged with the corresponding said opening.

13. The car seat of claim 12 wherein said pivot member has an exterior surface exposed through a hole in said base member, said exterior surface being divided into a first section and a second section, said first section including indicia representing said locking pin being in said leased position, said second section including indicia representing said locking pin being in said locked position.

14. The car seat of claim 7 further comprising a release indicator coupled to said actuation apparatus to provide a visual indication of the movement of said locking apparatus into said released position.

15. In a car seat having a base member connectable to a vehicle seat and a seat member detachably connectable to said base member, said seat member having a seat portion on which a child is positioned when utilizing said car seat, a latching mechanism comprising:
 a locking device movable between a locked position in which said seat member is engaged with said base member and a released position in which said seat member can be disengaged from said base member;
 an actuation apparatus operably connected to said locking device to affect movement thereof between said locked and released positions; and
 a release indicator coupled to said actuation apparatus to provide a visual indication of the movement of said locking device into said released position, said release indicator being a portion of said actuation apparatus that is recessed into said seat portion when said locking device is in said locked position and raised from said seat portion when said locking device is in said released position so that said child cannot be seated on said seat portion of said seat member when said locking device is not is said locked position.

16. The car seat of claim 15 wherein said portion of said actuation apparatus is a pivot flag that is mounted on a transverse actuation shaft rotatable to affect movement of said locking device, said pivot flag being pivoted in response to the movement of said locking device between said locked and released positions.

17. The car seat of claim 15 wherein said portion of said actuation apparatus is a latch lever that is connected to said locking device to affect movement of said locking device between said locked and released positions.

18. The car seat of claim 15 wherein said locking device comprises:
 a front locking apparatus movably supported on said seat portion;
 a rear locking apparatus movably supported on said seat portion; and
 a connecting link interconnecting said front and rear locking apparatus to affect simultaneous movement thereof when said actuation apparatus is manipulated to affect movement of said front and rear apparatus between said locked and released positions.

19. The car seat of claim 18 wherein each of said front and rear locking apparatus comprises:
 a pair of opposing rotatable spools, each spool being formed with a helical slot;
 a locking pin associated with each said spool and being movable between said locked position and said released position; and
 an actuation pin engaged with each respective said helical slot and with the corresponding said locking pin to affect linear movement of said locking pin between said locked and released positions in response to a rotational movement of said spool.

20. The car seat of claim 19 wherein each said locking pin is aligned with an axis of rotation of the corresponding said spool, the corresponding said actuation pin passing through said locking pin to be engagable with linear slots in said seat member on opposing sides of said spool to confine movement of said actuation pin into a linear direction, said actuation apparatus including an actuation knob affixed to a transverse actuation shaft to affect rotational movement thereof, and a drive link transferring rotational movement of said actuation shaft to each said front spool.

21. A car seat for transporting a child in a vehicle, comprising:
 a base member connectable to a vehicle seat;
 a seat member detachably connectable to said base member, said seat member having a seat portion on which said child is positioned when utilizing said car seat;
 a locking apparatus movable between a locked position interengaged between said base member and said seat member to secure said seat member to said base member and a released position to permit said seat member to be disengaged from said base member;
 an actuation apparatus operably connected to said locking apparatus to affect movement thereof between said locked and released positions; and
 a latch indicator that displays a signal that said locking apparatus has been moved into said locked position after a proper positioning of said seat member on said base member, said latch indicator including:
  a prelatch sensor cooperable with said seat member and said base member to indicate said proper positioning of said seat member on said base member;
  a latch sensor cooperable between said actuation apparatus and said seat member to indicate the movement of said locking apparatus into said locked position; and
  an LED indicator that illuminates to display the indication of both said prelatch and said latch sensors.

22. The car seat of claim 21 wherein both said prelatch sensor and said latch sensor are proximity sensors that produce a signal indicative of a magnetic member being within a sensing range of said proximity sensors.

23. The car seat of claim 22 wherein a first magnetic member is positioned on said base member to be cooperable with said prelatch proximity sensor mounted on said seat member, a second magnetic member being located on said actuation apparatus to be cooperable with said latch sensor mounted on said seat member.

24. The car seat of claim 23 wherein said LED indicator flashes a first signal representative of said prelatch proximity sensor coming into sensing range of said first magnetic member, and a second signal representative of said latch proximity sensor coming into sensing range of said second magnetic member after said first signal has been demonstrated.

25. A car seat for transporting a child in a vehicle, comprising:
 a base member connectable to a vehicle seat;
 a seat member detachably connectable to said base member, said seat member having a seat portion on which said child is positioned when utilizing said car seat;

a locking apparatus movable between a locked position interengaged between said base member and said seat member to secure said seat member to said base member and a released position to permit said seat member to be disengaged from said base member, said locking apparatus including first and second locking pins movable between said locked and released positions;

an actuation apparatus operably connected to said locking apparatus to affect movement thereof between said locked and released positions; and a latch indicator that displays a signal that said locking apparatus has been moved into said locked position after a proper positioning of said seat member on said base member, said latch indicator including a pivot member rotatable about an axis of rotation and being located to be engaged by one of said locking pins to affect rotation thereof when said locking pin is moved into said locked position.

26. The car seat of claim 25 wherein said locking pins are supported on said seat member, said base member including openings therein alignable, respectively, with a corresponding said locking pin, said pivot member being located on said base member such that the movement of the corresponding said locking pin engages said pivot member when engaged with the corresponding said opening.

27. The car seat of claim 26 wherein said pivot member has an exterior surface exposed through a hole in said base member, said exterior surface being divided into a first section and a second section, said first section including indicia representing said locking pin being in said released position, said second section including indicia representing said locking pin being in said locked position.

28. The car seat of claim 27 wherein each said locking pin has a pivot member associated therewith to provide a indication that each respective locking pin has been moved into said locked position.

* * * * *